US012515303B2

(12) United States Patent
Neuhoff et al.

(10) Patent No.: US 12,515,303 B2
(45) Date of Patent: Jan. 6, 2026

(54) POWERED FASTENER DRIVER

(71) Applicant: MILWAUKEE ELECTRIC TOOL CORPORATION, Brookfield, WI (US)

(72) Inventors: Mitchell T. Neuhoff, Waukesha, WI (US); Mark C. Hughes, Waukesha, WI (US); Bradley S. Houskamp, Wauwatosa, WI (US); Ivan N. Zozulya, Waukesha, WI (US); Jacob N. Zimmerman, Pewaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 18/654,105

(22) Filed: May 3, 2024

(65) Prior Publication Data

US 2024/0367297 A1 Nov. 7, 2024

Related U.S. Application Data

(60) Provisional application No. 63/464,217, filed on May 5, 2023.

(51) Int. Cl.
*B25C 1/04* (2006.01)
*B25C 1/00* (2006.01)

(52) U.S. Cl.
CPC .............. *B25C 1/042* (2013.01); *B25C 1/001* (2013.01); *B25C 1/047* (2013.01)

(58) Field of Classification Search
CPC ........... B25C 1/047; B25C 1/043; B25C 1/06; B25C 1/008; B25C 1/04; B25C 1/041; B25C 5/13; B25C 1/001
See application file for complete search history.

(56) References Cited

U.S. PATENT DOCUMENTS

| | | | |
|---|---|---|---|
| 2,575,455 | A | 11/1951 | Lang |
| 2,580,444 | A | 1/1952 | Lang |
| 2,624,879 | A | 1/1953 | Baird |
| 2,632,890 | A | 3/1953 | Tietig |
| 2,666,201 | A | 1/1954 | Van Orden |
| 2,701,360 | A | 2/1955 | Lang |
| 3,330,462 | A | 7/1967 | Colechia et al. |

(Continued)

FOREIGN PATENT DOCUMENTS

| | | | |
|---|---|---|---|
| CN | 1308120 | C | 4/2007 |
| CN | 201098880 | Y | 8/2008 |

(Continued)

OTHER PUBLICATIONS

Siding Tips, "Siding Tips," available at <https://www.sidingtips.ca/> web page visited Feb. 22, 2023 (2 pages).

(Continued)

*Primary Examiner* — Veronica Martin
(74) *Attorney, Agent, or Firm* — Michael Best & Friedrich LLP

(57) ABSTRACT

A powered fastener driver including a piston movable within the inner cylinder from a top-dead-center (TDC) position to a driven or bottom-dead-center (BDC) position. The piston has a diameter of less than 45 mm, and a stroke length of the piston between the TDC position and the BDC position measuring greater than 60 mm and less than 90 mm.

20 Claims, 16 Drawing Sheets

(56) References Cited

U.S. PATENT DOCUMENTS

| | | | |
|---|---|---|---|
| 3,496,840 | A | 2/1970 | Wandel et al. |
| 3,524,576 | A | 8/1970 | Bader |
| 3,558,031 | A | 1/1971 | Hillier |
| 3,568,908 | A | 3/1971 | Bader |
| 3,628,715 | A | 12/1971 | Maynard et al. |
| 3,654,832 | A | 4/1972 | Lana |
| 3,672,738 | A | 6/1972 | Buttriss |
| 3,688,966 | A | 9/1972 | Perkins et al. |
| 3,703,981 | A | 11/1972 | Smith |
| 3,708,097 | A | 1/1973 | Fisher |
| 3,762,733 | A | 10/1973 | Lana |
| 3,854,648 | A | 12/1974 | Inzoli et al. |
| 3,858,780 | A | 1/1975 | Perkins et al. |
| 3,863,824 | A | 2/1975 | Bakoledis |
| 3,930,297 | A | 1/1976 | Potucek et al. |
| 3,934,779 | A | 1/1976 | Dent |
| 3,945,551 | A | 3/1976 | Sato et al. |
| 4,014,488 | A | 3/1977 | Potucek et al. |
| 4,053,094 | A | 10/1977 | Males |
| 4,149,297 | A | 4/1979 | Monacelli |
| 4,251,017 | A | 2/1981 | Doyle et al. |
| 4,299,021 | A | 11/1981 | Williams |
| 4,433,782 | A | 2/1984 | Figge et al. |
| 4,442,965 | A | 4/1984 | Leistner |
| 4,509,669 | A | 4/1985 | Elliesen |
| 4,585,154 | A | 4/1986 | Fealey et al. |
| 4,600,135 | A | 7/1986 | Mukoyama |
| 4,609,135 | A | 9/1986 | Elliesen |
| 4,669,648 | A | 6/1987 | Monacelli |
| 4,679,719 | A | 7/1987 | Kramer |
| 4,684,050 | A | 8/1987 | Masas |
| 4,731,917 | A | 3/1988 | Krowl |
| 4,763,824 | A | 8/1988 | Ebihara |
| 4,815,647 | A | 3/1989 | Chou |
| 4,821,937 | A | 4/1989 | Rafferty |
| 4,932,480 | A | 6/1990 | Golsch |
| 4,942,996 | A | 7/1990 | Wolfberg et al. |
| 5,025,971 | A | 6/1991 | Schafer et al. |
| 5,038,993 | A | 8/1991 | Schafer et al. |
| 5,094,380 | A | 3/1992 | Nasiatka |
| 5,135,152 | A | 8/1992 | Uno et al. |
| 5,193,730 | A | 3/1993 | Tanaka et al. |
| 5,201,449 | A | 4/1993 | Miller |
| 5,267,682 | A | 12/1993 | Okouchi |
| 5,297,713 | A | 3/1994 | Perra et al. |
| 5,441,192 | A | 8/1995 | Sugita et al. |
| 5,474,222 | A | 12/1995 | Kanai et al. |
| 5,529,234 | A | 6/1996 | Juneau |
| 5,558,264 | A | 9/1996 | Weinstein |
| 5,579,975 | A | 12/1996 | Moorman |
| 5,605,271 | A | 2/1997 | Russell |
| 5,628,445 | A | 5/1997 | Braddock et al. |
| 5,634,582 | A | 6/1997 | Morrison, Jr. et al. |
| 5,662,257 | A | 9/1997 | Mukoyama et al. |
| 5,683,024 | A | 11/1997 | Eminger et al. |
| 5,697,541 | A | 12/1997 | Burke et al. |
| 5,743,455 | A | 4/1998 | Holliday |
| 5,772,098 | A | 6/1998 | Crutcher |
| 5,794,831 | A | 8/1998 | Velan et al. |
| 5,803,338 | A | 9/1998 | Singer et al. |
| 5,911,350 | A | 6/1999 | Bolger et al. |
| 6,032,848 | A | 3/2000 | Smolinski |
| 6,095,393 | A | 8/2000 | Smolinski |
| 6,123,241 | A | 9/2000 | Walter et al. |
| 6,152,346 | A | 11/2000 | Laubach |
| 6,199,739 | B1 | 3/2001 | Mukoyama et al. |
| 6,213,371 | B1 | 4/2001 | Cabrera |
| 6,371,348 | B1 | 4/2002 | Canlas et al. |
| 6,371,352 | B1 | 4/2002 | Mochizuki |
| 6,393,711 | B1 | 5/2002 | Freund |
| 6,394,332 | B2 | 5/2002 | Akiba |
| 6,422,447 | B1 | 7/2002 | White et al. |
| 6,431,428 | B1 | 8/2002 | Chen |
| 6,431,430 | B1 | 8/2002 | Jalbert et al. |
| 6,443,348 | B2 | 9/2002 | Lamb |
| 6,488,195 | B2 | 12/2002 | White et al. |
| 6,499,643 | B1 | 12/2002 | Hewitt |
| 6,502,737 | B2 | 1/2003 | Akiba |
| 6,516,989 | B1 | 2/2003 | Sun |
| 6,592,014 | B2 | 7/2003 | Smolinski |
| 6,595,840 | B1 | 7/2003 | Jaensch et al. |
| 6,612,476 | B2 | 9/2003 | Smolinski |
| 6,641,018 | B2 | 11/2003 | Akiba |
| 6,672,498 | B2 | 1/2004 | White et al. |
| 6,675,999 | B2 | 1/2004 | Mukoyama et al. |
| 6,679,406 | B2 | 1/2004 | Sakai et al. |
| 6,685,078 | B2 | 2/2004 | Wohlwend et al. |
| 6,695,196 | B2 | 2/2004 | Hamada et al. |
| 6,769,193 | B1 | 8/2004 | Meisner |
| 6,776,320 | B2 | 8/2004 | Sprenger et al. |
| 6,776,322 | B2 | 8/2004 | Villela et al. |
| 6,779,699 | B2 | 8/2004 | Aoki et al. |
| 6,779,700 | B2 | 8/2004 | Bruins et al. |
| 6,796,477 | B2 | 9/2004 | Chen |
| 6,820,788 | B2 | 11/2004 | Akiba |
| 6,824,036 | B2 | 11/2004 | Walter |
| D501,383 | S | 2/2005 | Fang et al. |
| 6,883,696 | B1 | 4/2005 | Steinbrunner et al. |
| 6,889,711 | B2 | 5/2005 | Vetoretti et al. |
| 6,905,052 | B2 | 6/2005 | Sakai et al. |
| 6,913,179 | B1 | 7/2005 | Chen |
| 6,948,647 | B1 | 9/2005 | Niblett et al. |
| 6,955,281 | B1 | 10/2005 | Wei |
| 6,957,757 | B1 | 10/2005 | Huang |
| 6,966,476 | B2 | 11/2005 | Jalbert et al. |
| 6,966,477 | B1 | 11/2005 | Chien-Kuo et al. |
| 6,968,945 | B2 | 11/2005 | Bruins et al. |
| 6,974,062 | B2 | 12/2005 | Akiba |
| 6,986,450 | B2 | 1/2006 | Matthews et al. |
| 7,000,294 | B2 | 2/2006 | Kakuda et al. |
| 7,004,366 | B2 | 2/2006 | Schiestl et al. |
| 7,021,251 | B2 | 4/2006 | Ohmori et al. |
| 7,048,164 | B2 | 5/2006 | Favre-Bulle et al. |
| 7,066,371 | B2 | 6/2006 | Villela et al. |
| 7,086,573 | B1 | 8/2006 | Wen |
| 7,108,079 | B2 | 9/2006 | Sakai et al. |
| 7,111,364 | B2 | 9/2006 | Bader et al. |
| 7,131,563 | B2 | 11/2006 | Wen |
| 7,131,564 | B2 | 11/2006 | Matthews et al. |
| 7,134,586 | B2 | 11/2006 | McGee et al. |
| 7,137,186 | B2 | 11/2006 | Wojcicki et al. |
| 7,137,541 | B2 | 11/2006 | Baskar et al. |
| 7,143,920 | B2 | 12/2006 | Panasik et al. |
| 7,175,064 | B2 | 2/2007 | Schell et al. |
| 7,194,988 | B2 | 3/2007 | Ohmori et al. |
| 7,210,607 | B2 | 5/2007 | Niblet et al. |
| 7,222,767 | B1 | 5/2007 | Yang |
| 7,225,962 | B2 | 6/2007 | Porth et al. |
| 7,240,817 | B2 | 7/2007 | Higuchi |
| 7,275,505 | B2 | 10/2007 | Moeller et al. |
| 7,285,877 | B2 | 10/2007 | Gorti et al. |
| 7,299,963 | B2 | 11/2007 | Moeller et al. |
| 7,306,052 | B2 | 12/2007 | Vahabi-nNjad et al. |
| 7,320,422 | B2 | 1/2008 | Schell et al. |
| 7,331,098 | B2 | 2/2008 | Matthews et al. |
| 7,344,054 | B2 | 3/2008 | Sakai et al. |
| 7,444,963 | B2 | 11/2008 | Tanaka |
| 7,455,207 | B2 | 11/2008 | Wojcicki et al. |
| 7,469,811 | B2 | 12/2008 | Shima et al. |
| 7,490,746 | B2 | 2/2009 | Sakai et al. |
| 7,494,036 | B2 | 2/2009 | Shima et al. |
| 7,520,029 | B2 | 4/2009 | Jonsson |
| 7,546,938 | B2 | 6/2009 | Panasik et al. |
| 7,565,989 | B2 | 7/2009 | Lai et al. |
| 7,575,139 | B2 | 8/2009 | Thompson |
| 7,617,959 | B2 | 11/2009 | Yang |
| 7,628,304 | B2 | 12/2009 | Yamamoto et al. |
| 7,641,089 | B2 | 1/2010 | Schell et al. |
| 7,654,430 | B2 | 2/2010 | Cho et al. |
| 7,677,426 | B2 | 3/2010 | Tillinghast et al. |
| 7,681,661 | B2 | 3/2010 | Sakai et al. |
| 7,686,199 | B2 | 3/2010 | Gross et al. |
| 7,699,201 | B2 | 4/2010 | Hagan et al. |
| 7,721,817 | B2 | 5/2010 | McGee et al. |

(56) References Cited

U.S. PATENT DOCUMENTS 7,721,928 B2 5/2010 Chen et al.
7,726,536 B2 6/2010 Gross et al.
7,727,003 B2 6/2010 Ceroll et al.
7,739,807 B2 6/2010 Grant
7,748,097 B1 7/2010 Matthews et al.
7,775,412 B2 8/2010 Nemeth
7,815,081 B2 10/2010 Gist et al.
7,854,360 B2 12/2010 Suda
7,866,521 B2 1/2011 Gross et al.
7,886,950 B2 2/2011 Lin et al.
7,896,212 B2 3/2011 Uejima et al.
7,917,997 B2 4/2011 Jonsson
7,918,374 B2 4/2011 Gardner et al.
7,922,054 B2 4/2011 Cole, Jr.
7,931,180 B2 4/2011 Lai
7,942,299 B2 5/2011 Steinbrunner et al.
7,950,556 B2 5/2011 Hagan
7,975,777 B2 7/2011 Krondorfer et al.
8,006,883 B2 8/2011 Schell et al.
8,035,955 B2 10/2011 Parks et al.
8,042,717 B2 10/2011 Lam et al.
8,051,919 B2 11/2011 Hagan et al.
8,052,021 B2 11/2011 Wu
8,056,785 B2 11/2011 Gosis et al.
RE42,987 E 12/2011 Akiba
8,087,556 B2 1/2012 Oomori et al.
8,104,658 B2 1/2012 Yu
8,123,096 B2 2/2012 Iijima et al.
8,167,056 B2 5/2012 Ito et al.
8,167,182 B2 5/2012 Shima et al.
8,172,118 B2 5/2012 Niblett et al.
8,215,528 B2 7/2012 Matsunaga et al.
8,231,039 B2 7/2012 Buck et al.
8,235,270 B2 8/2012 Gosis et al.
8,276,798 B2 10/2012 Moeller et al.
8,282,328 B2 10/2012 Gardner et al.
8,302,832 B2 11/2012 Porth et al.
8,308,034 B2 11/2012 Shibata et al.
8,313,012 B2 11/2012 Shima et al.
8,336,748 B2 12/2012 Hlinka et al.
8,336,749 B2 12/2012 Largo
8,347,978 B2 1/2013 Forster et al.
8,348,695 B2 1/2013 Puzio et al.
8,397,970 B2 3/2013 Iijima et al.
8,408,327 B2 4/2013 Forster et al.
8,412,179 B2 4/2013 Gerold et al.
8,413,867 B2 4/2013 Gardner et al.
8,434,566 B2 5/2013 Forster et al.
8,439,242 B2 5/2013 Tanji et al.
8,443,913 B2 5/2013 Nagasaka et al.
8,464,921 B2 6/2013 Shima et al.
8,479,963 B2 7/2013 Kitagawa et al.
8,485,407 B2 7/2013 Liu et al.
8,544,561 B2 10/2013 Aihara
8,550,417 B2 10/2013 Lee et al.
8,556,148 B2 10/2013 Schell et al.
8,573,322 B2 11/2013 Nagasaka et al.
8,602,284 B2 12/2013 Tillinghast et al.
8,622,271 B2 1/2014 Shima et al.
8,657,173 B2 2/2014 Uejima et al.
8,672,205 B2 3/2014 Leitner
8,684,245 B2 4/2014 Canlas, Jr. et al.
8,690,036 B2 4/2014 Schell et al.
8,701,956 B2 4/2014 Takemura et al.
8,733,610 B2 5/2014 Pedicini
8,746,526 B2 6/2014 Hlinka et al.
8,752,744 B2 6/2014 Okouchi et al.
D713,705 S 9/2014 Mina et al.
8,857,692 B2 10/2014 Shima et al.
8,931,677 B2 1/2015 Porth et al.
8,939,340 B2 1/2015 Gardner et al.
8,939,341 B2 1/2015 Pedicini et al.
8,960,516 B2 2/2015 Iijima et al.
8,960,635 B2 2/2015 Brendel et al.
8,985,424 B2 3/2015 Miyashita
8,998,057 B2 4/2015 Gathers
9,016,397 B2 4/2015 Kuroyanagi et al.
9,046,119 B2 6/2015 Choi
9,221,162 B2 12/2015 Kitagawa et al.
9,242,359 B2 1/2016 Staples et al.
9,321,162 B2 4/2016 Adachi et al.
9,333,632 B2 5/2016 Tanji
9,457,461 B2 10/2016 Francis et al.
9,469,021 B2 10/2016 Gregory et al.
9,486,904 B2 11/2016 Gregory et al.
9,498,871 B2 11/2016 Gregory et al.
9,522,464 B2 12/2016 Segura et al.
9,533,408 B2 1/2017 Forster et al.
9,555,530 B2 1/2017 Pedicini et al.
9,604,352 B2 3/2017 Kobayashi et al.
9,636,811 B2 5/2017 Segura
9,643,305 B2 5/2017 Gregory et al.
9,649,755 B2 5/2017 Gregory et al.
9,662,777 B2 5/2017 Pomeroy et al.
9,664,045 B2 5/2017 Mina et al.
9,664,387 B2 5/2017 Gerold et al.
9,669,529 B2 6/2017 Ishizawa et al.
9,731,408 B2 8/2017 Groer et al.
9,827,658 B2 11/2017 Gregory et al.
9,873,189 B2 1/2018 Gerold et al.
9,889,547 B2 2/2018 Marks
9,937,608 B2 4/2018 Hahn et al.
10,045,606 B2 8/2018 Cirincione, II et al.
10,150,208 B2 12/2018 Lin
10,160,108 B2 12/2018 Beck
10,173,310 B2 1/2019 Wyler et al.
10,215,219 B1 2/2019 Morley
D843,192 S 3/2019 Reed
10,220,497 B2 3/2019 Vandenberg
10,232,498 B2 3/2019 Nishida et al.
10,265,840 B2 4/2019 Anstett et al.
10,286,539 B2 5/2019 Francis et al.
10,307,903 B2 6/2019 Reed
D854,820 S 7/2019 Jablonski et al.
10,350,741 B2 7/2019 Brendel et al.
10,414,030 B2 9/2019 Vandenberg
10,414,033 B2 9/2019 Ekstrom et al.
10,421,176 B2 9/2019 Vandenberg
10,427,289 B2 10/2019 Segura et al.
10,456,897 B2 10/2019 Grandjean et al.
10,493,607 B2 12/2019 Jaskot et al.
10,500,713 B2 12/2019 Velderman et al.
10,576,616 B2 3/2020 Hays et al.
10,632,600 B2 4/2020 Pomeroy et al.
10,632,601 B2 4/2020 Pomeroy et al.
10,654,154 B2 5/2020 Schnell et al.
10,668,608 B2 6/2020 Meyer
10,710,227 B2 7/2020 Pomeroy et al.
10,711,610 B2 7/2020 Mina et al.
10,717,178 B2 7/2020 Yamamoto et al.
10,744,629 B2 8/2020 Ishizawa
10,759,029 B2 9/2020 Schnell et al.
10,759,034 B2 9/2020 Dye
10,773,366 B2 9/2020 Kamimoto et al.
10,800,021 B2 10/2020 Tanaka
10,843,318 B2 11/2020 Kobori et al.
10,850,377 B2 12/2020 Steurer
10,875,166 B2 12/2020 Ueda
10,888,981 B2 1/2021 Gregory et al.
10,898,996 B2 1/2021 Heeb et al.
10,898,997 B2 1/2021 Yamamoto et al.
10,926,390 B2 2/2021 Dittrich et al.
10,926,391 B2 2/2021 Jablonski et al.
10,940,579 B2 3/2021 Watanabe et al.
10,946,506 B1 3/2021 Ueda
10,960,523 B1 3/2021 Connors
10,987,790 B2 4/2021 Garber
11,007,629 B2 5/2021 Yamamoto et al.
11,034,005 B2 6/2021 Suarez
11,052,522 B2 7/2021 Ishikawa et al.
11,072,058 B2 7/2021 Wyler et al.
11,123,849 B2 9/2021 Ishikawa et al.
11,161,230 B2 11/2021 Canlas, Jr. et al.
11,179,836 B2 11/2021 Gregory et al.

(56) References Cited

U.S. PATENT DOCUMENTS

| | | | |
|---|---|---|---|
| 11,185,967 | B2 | 11/2021 | Oouchi |
| 11,192,236 | B2 | 12/2021 | Velderman et al. |
| 11,224,960 | B2 | 1/2022 | Garces et al. |
| 11,229,995 | B2 | 1/2022 | Gregory et al. |
| 11,279,014 | B2 | 3/2022 | Yamamoto et al. |
| 11,298,811 | B2 | 4/2022 | Lin |
| 11,305,413 | B2 | 4/2022 | Zhou et al. |
| 11,338,422 | B2 | 5/2022 | Yamamoto et al. |
| 11,376,722 | B2 | 7/2022 | Kondou et al. |
| 11,498,194 | B2 | 11/2022 | Wechselberger et al. |
| 11,518,012 | B2 | 12/2022 | Takeuchi et al. |
| 11,571,794 | B2 | 2/2023 | Bierdeman et al. |
| 11,590,638 | B2 | 2/2023 | Sato et al. |
| 11,633,840 | B2 | 4/2023 | Liu et al. |
| 2002/0017548 | A1 | 2/2002 | Jalbert et al. |
| 2002/0079111 | A1 | 6/2002 | Camp |
| 2002/0117531 | A1 | 8/2002 | Schell et al. |
| 2002/0125294 | A1 | 9/2002 | Villela et al. |
| 2003/0015565 | A1 | 1/2003 | Lee |
| 2003/0183049 | A1 | 10/2003 | Bader et al. |
| 2004/0050888 | A1 | 3/2004 | Warner |
| 2004/0148786 | A1 | 8/2004 | Achterberg et al. |
| 2005/0006426 | A1 | 1/2005 | Walter |
| 2005/0133552 | A1 | 6/2005 | Lawrence |
| 2006/0022002 | A1 | 2/2006 | Marks |
| 2006/0104732 | A1 | 5/2006 | Huang |
| 2006/0108391 | A1 | 5/2006 | Leasure |
| 2006/0162302 | A1 | 7/2006 | Terrell |
| 2006/0261128 | A1 | 11/2006 | Wen |
| 2006/0261129 | A1 | 11/2006 | McGee et al. |
| 2006/0273132 | A1 | 12/2006 | Leasure et al. |
| 2007/0080278 | A1 | 4/2007 | Wen |
| 2007/0090148 | A1 | 4/2007 | Cho et al. |
| 2007/0108250 | A1 | 5/2007 | Odoni et al. |
| 2007/0194077 | A1 | 8/2007 | Lee |
| 2007/0215668 | A1 | 9/2007 | Tabacco et al. |
| 2007/0267458 | A1 | 11/2007 | Chenn |
| 2008/0000939 | A1 | 1/2008 | Walsh et al. |
| 2008/0006673 | A1 | 1/2008 | Chou et al. |
| 2008/0017685 | A1 | 1/2008 | Buck et al. |
| 2008/0017686 | A1 | 1/2008 | Buck |
| 2008/0017687 | A1 | 1/2008 | Buck et al. |
| 2008/0073404 | A1 | 3/2008 | Hylton |
| 2008/0110652 | A1 | 5/2008 | Wen |
| 2008/0148915 | A1 | 6/2008 | Nickels et al. |
| 2008/0164295 | A1 | 7/2008 | Wu et al. |
| 2009/0120281 | A1 | 5/2009 | Yang |
| 2009/0134191 | A1 | 5/2009 | Phillips |
| 2009/0166394 | A1 | 7/2009 | Gyorkos |
| 2009/0277939 | A1 | 11/2009 | Ou |
| 2010/0001034 | A1 | 1/2010 | Huang |
| 2010/0243286 | A1 | 9/2010 | Hoshino et al. |
| 2011/0049215 | A1 | 3/2011 | Mcafee et al. |
| 2011/0067895 | A1 | 3/2011 | Nobe et al. |
| 2011/0198381 | A1 | 8/2011 | McCardle et al. |
| 2011/0235679 | A1 | 9/2011 | Cordeiro et al. |
| 2011/0303428 | A1 | 12/2011 | Roth et al. |
| 2011/0303728 | A1 | 12/2011 | Franz et al. |
| 2011/0303733 | A1 | 12/2011 | Fielitz et al. |
| 2011/0308829 | A1 | 12/2011 | Yang |
| 2012/0113571 | A1 | 5/2012 | Merhar, III et al. |
| 2012/0160889 | A1 | 6/2012 | Tanji |
| 2013/0206811 | A1 | 8/2013 | Zhao et al. |
| 2013/0320063 | A1 | 12/2013 | Gregory et al. |
| 2013/0320064 | A1 | 12/2013 | Gregory et al. |
| 2014/0001229 | A1 | 1/2014 | Ichikawa et al. |
| 2014/0034701 | A1 | 2/2014 | Komazaki |
| 2014/0047722 | A1 | 2/2014 | Onose et al. |
| 2014/0076954 | A1 | 3/2014 | Miller et al. |
| 2014/0097217 | A1 | 4/2014 | Walsh |
| 2014/0158740 | A1 | 6/2014 | Akutsu et al. |
| 2014/0263535 | A1 | 9/2014 | Rajani et al. |
| 2015/0136434 | A1 | 5/2015 | Aoki et al. |
| 2015/0266201 | A1 | 9/2015 | Nakashima |
| 2015/0283690 | A1 | 10/2015 | Welte et al. |

| | | | |
|---|---|---|---|
| 2016/0229043 | A1 | 8/2016 | Wyler et al. |
| 2016/0271748 | A1 | 9/2016 | Gerold et al. |
| 2016/0288305 | A1 | 10/2016 | McCardle et al. |
| 2016/0368126 | A1 | 12/2016 | Liu et al. |
| 2017/0259422 | A1 | 9/2017 | Takeyama et al. |
| 2017/0361442 | A1 | 12/2017 | Fairbanks et al. |
| 2017/0361443 | A1 | 12/2017 | Sareault et al. |
| 2018/0126528 | A1 | 5/2018 | Pomeroy et al. |
| 2018/0126529 | A1 | 5/2018 | Pomeroy et al. |
| 2019/0111552 | A1 | 4/2019 | Nagao |
| 2019/0224831 | A1 | 7/2019 | Yamamoto et al. |
| 2019/0224832 | A1 | 7/2019 | Watanabe et al. |
| 2019/0224833 | A1 | 7/2019 | Watanabe et al. |
| 2019/0275625 | A1 | 9/2019 | Weissenfels |
| 2019/0291248 | A1 | 9/2019 | Vandenberg |
| 2020/0030954 | A1 | 1/2020 | Wolf et al. |
| 2020/0030955 | A1 | 1/2020 | Kurth et al. |
| 2020/0114500 | A1* | 4/2020 | Bierdeman ............. B25C 1/047 |
| 2020/0130156 | A1 | 4/2020 | Takeuchi et al. |
| 2020/0194747 | A1 | 6/2020 | Rudolph et al. |
| 2020/0215672 | A1 | 7/2020 | Pomeroy et al. |
| 2020/0230791 | A1 | 7/2020 | Pomeroy et al. |
| 2020/0316766 | A1 | 10/2020 | Machida |
| 2020/0391364 | A1 | 12/2020 | Yasutomi et al. |
| 2020/0391365 | A1 | 12/2020 | Tanaka |
| 2020/0398413 | A1 | 12/2020 | Tanaka |
| 2021/0031351 | A1 | 2/2021 | Tanaka |
| 2021/0107125 | A1 | 4/2021 | Gregory et al. |
| 2021/0154818 | A1 | 5/2021 | Watanabe et al. |
| 2021/0197352 | A1 | 7/2021 | Ueda |
| 2021/0229251 | A1 | 7/2021 | Dittrich et al. |
| 2021/0237253 | A1 | 8/2021 | Moss et al. |
| 2021/0276170 | A1 | 9/2021 | Li et al. |
| 2021/0299834 | A1 | 9/2021 | Canlas, Jr. et al. |
| 2021/0299835 | A1 | 9/2021 | Ward et al. |
| 2021/0299837 | A1 | 9/2021 | Garces et al. |
| 2021/0347022 | A1 | 11/2021 | Leathrum et al. |
| 2021/0347023 | A1 | 11/2021 | Carrier et al. |
| 2021/0347025 | A1 | 11/2021 | Wyler et al. |
| 2021/0347026 | A1 | 11/2021 | Wyler et al. |
| 2021/0362311 | A1 | 11/2021 | Garces et al. |
| 2021/0387318 | A1 | 12/2021 | Ueda |
| 2022/0040810 | A1 | 2/2022 | Schlosser et al. |
| 2022/0055204 | A1 | 2/2022 | Velderman et al. |
| 2022/0065283 | A1 | 3/2022 | Pöltinger et al. |
| 2022/0080571 | A1 | 3/2022 | Gregory et al. |
| 2022/0105614 | A1 | 4/2022 | Robinson et al. |
| 2022/0134525 | A1 | 5/2022 | Bandy et al. |
| 2022/0178147 | A1 | 6/2022 | Schuss, Jr. et al. |
| 2022/0184786 | A1 | 6/2022 | Tse et al. |
| 2022/0388136 | A1 | 12/2022 | Rux |

FOREIGN PATENT DOCUMENTS

| | | | |
|---|---|---|---|
| CN | 201300400 | Y | 9/2009 |
| CN | 101259611 | B | 4/2010 |
| CN | 101905455 | A | 12/2010 |
| CN | 201848826 | U | 6/2011 |
| CN | 102303308 | A | 1/2012 |
| CN | 102205531 | B | 11/2014 |
| CN | 103372845 | B | 7/2015 |
| CN | 204525371 | U | 8/2015 |
| CN | 204640154 | U | 9/2015 |
| CN | 205166854 | U | 4/2016 |
| CN | 205967636 | U | 2/2017 |
| CN | 108145658 | A | 6/2018 |
| CN | 207509150 | U | 6/2018 |
| CN | 207824808 | U | 9/2018 |
| CN | 209615401 | U | 11/2019 |
| CN | 209773603 | U | 12/2019 |
| CN | 112077794 | A | 12/2020 |
| DE | 6926965 | U | 11/1969 |
| DE | 2248956 | A1 | 4/1973 |
| DE | 2428774 | A1 | 12/1975 |
| DE | 2439147 | A1 | 2/1976 |
| DE | 9001996 | U1 | 4/1990 |
| DE | 4121256 | A1 | 1/1993 |
| DE | 19906680 | A1 | 8/2000 |
| DE | 10125846 | A1 | 12/2001 |

(56) References Cited

FOREIGN PATENT DOCUMENTS

| | | | |
|---|---|---|---|
| DE | 102004032788 | A1 | 2/2006 |
| DE | 202006008503 | U1 | 8/2006 |
| DE | 102005045915 | A1 | 3/2007 |
| DE | 102005000145 | A1 | 5/2007 |
| DE | 102006027575 | A1 | 12/2007 |
| DE | 102006046842 | A1 | 4/2008 |
| DE | 102006053149 | A1 | 5/2008 |
| DE | 202010012259 | U1 | 12/2010 |
| DE | 202013103822 | U1 | 11/2013 |
| DE | 202021102698 | U1 | 11/2021 |
| EP | 1582300 | A2 | 10/2005 |
| EP | 2883664 | A1 | 6/2015 |
| EP | 3653341 | A1 | 5/2020 |
| EP | 3653342 | A2 | 5/2020 |
| EP | 3517254 | B1 | 11/2021 |
| WO | WO0214026 | A2 | 2/2002 |
| WO | WO2004048046 | A1 | 6/2004 |
| WO | WO2006036046 | A1 | 4/2006 |
| WO | WO2012006312 | A1 | 1/2012 |
| WO | WO2012082850 | A2 | 6/2012 |
| WO | WO2012113443 | A1 | 8/2012 |
| WO | WO2012114292 | A1 | 8/2012 |
| WO | WO2014119168 | A1 | 8/2014 |
| WO | WO2016177795 | A1 | 11/2016 |
| WO | WO2017090376 | A1 | 6/2017 |
| WO | WO2020008768 | A1 | 1/2020 |
| WO | WO2021001196 | A1 | 1/2021 |
| WO | WO2021084993 | A1 | 5/2021 |
| WO | WO2021242305 | A1 | 12/2021 |

OTHER PUBLICATIONS

Amazon, “Bostitch VSA4 Vinyl Siding Adaptor Kit,” available at <https://www.amazon.com/BOSTITCH-VSA4-Vinyl-Siding-Adaptor/dp/B000EDRQRI> web page visited Feb. 22, 2023 (8 pages).

Dewalt, “20V Max Lithium-Ion 15-Degree Cordless Roofing Nailer Kit with 2.0 Ah Battery Charger and Bag,” available at <https://www.homedepot.com/p/DEWALT-20V-MAX-Lithium-Ion-15-Degree-Cordless-Roofing-Nailer-Kit-with-2-0Ah-Battery-Charger-and-Bag-DCN45RND1/312302764> web page visited Feb. 22, 2023 (5 pages).

* cited by examiner

POWERED FASTENER DRIVER

CROSS-REFERENCE TO RELATED APPLICATIONS

This application claims priority to U.S. Provisional Patent Application No. 63/464,217 filed on May 5, 2023, the entire contents of which is incorporated herein by reference.

FIELD OF THE INVENTION

The present invention relates to powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a fastener delivery mechanism for individually transferring fasteners from the magazine to a fastener driving channel, where the fastener is impacted by a driver blade during a fastener driving operation.

SUMMARY OF THE INVENTION

In some aspects, the techniques described herein relate to a powered fastener driver including: a housing; an inner cylinder within the housing; a piston movable within the inner cylinder from a top-dead-center (TDC) position to a driven or bottom-dead-center (BDC) position, the piston having a diameter of less than 45 mm, and a stroke length of the piston between the TDC position and the BDC position measuring greater than 60 mm and less than 90 mm; a driver blade attached to the piston for movement therewith along a driving axis from the TDC position toward the BDC position for driving a fastener into a workpiece, the driver blade including, a first end, a second end, and a plurality of drive teeth extending from one side between the first end and the second end; a lifter operable to move the piston and driver blade from the BDC position toward the TDC position, wherein the lifter includes a body and a plurality of drive pins supported upon the body, wherein each of the drive pins is configured to engage one of the drive teeth, and wherein the drive pins are positioned on the body along an imaginary circle coaxial with a rotational axis of the lifter and having a diameter of less than 40 mm; and a drive unit operably coupled to the lifter to provide torque thereto, causing the lifter to rotate.

In some aspects, the techniques described herein relate to a powered fastener driver including: a housing; an inner cylinder within the housing; a piston movable within the inner cylinder from a top-dead-center (TDC) position to a driven or bottom-dead-center (BDC) position, the piston having a circumferential groove, a diameter of less than 45 mm, and a stroke length of the piston between the TDC position and the BDC position measuring greater than 60 mm and less than 90 mm; a seal ring positioned within the circumferential groove and configured to engage an inner surface of the inner cylinder, the seal ring having a thickness of 2 mm to 5.5 mm; a driver blade attached to the piston for movement therewith along a driving axis from the TDC position toward the BDC position for driving a fastener into a workpiece, the driver blade including, a first end, a second end, and a plurality of drive teeth extending from one side between the first end and the second end; a lifter operable to move the piston and driver blade from the BDC position toward the TDC position, wherein the lifter includes a body and a plurality of drive pins supported upon the body, wherein each of the drive pins is configured to engage one of the drive teeth; and a drive unit operably coupled to the lifter to provide torque thereto, causing the lifter to rotate.

In some aspects, the techniques described herein relate to a powered fastener driver including: a housing; an inner cylinder within the housing; an outer storage chamber cylinder positioned within the housing and including pressurized gas in fluid communication with the inner cylinder, wherein the outer storage chamber cylinder includes a first end and a second end opposite the first end, and wherein the second end of the outer storage chamber cylinder is non-concentric with the first end of the outer storage chamber cylinder a piston movable within the inner cylinder from a top-dead-center (TDC) position to a driven or bottom-dead-center (BDC) position, the piston having a circumferential groove, a diameter of less than 45 mm, and a stroke length of the piston between the TDC position and the BDC position measuring greater than 60 mm and less than 90 mm; a seal ring positioned within the circumferential groove and configured to engage an inner surface of the inner cylinder; a driver blade attached to the piston for movement therewith along a driving axis from the TDC position toward the BDC position for driving a fastener into a workpiece, the driver blade including, a first end, a second end, and a plurality of teeth extending from one side between the first end and the second end; a lifter operable to move the piston and driver blade from the BDC position toward the TDC position, wherein the lifter includes a body and a plurality of drive pins supported upon the body, wherein each of the drive pins is configured to engage one of the drive teeth; and a drive unit operably coupled to the lifter to provide torque thereto, causing the lifter to rotate; wherein the outer storage chamber cylinder defines a volume, wherein a first portion of the volume is defined on a first side of the driving axis and a second portion of the volume is defined on a second side of the driving axis, and wherein the second portion is greater than the first portion, and wherein the housing defines a head portion, a drive unit housing portion, and a handle portion that is spaced apart from the drive unit housing portion, and wherein the second portion of the volume is at least partially positioned between the drive unit housing portion and the handle portion.

In some aspects, the techniques described herein relate to a powered fastener driver including: a housing; a nosepiece extending from the housing; an inner cylinder within the housing; a piston movable within the inner cylinder from a top-dead-center (TDC) position to a driven or bottom-dead-center (BDC) position, the piston having a stroke length of the piston between the TDC position and the BDC position measuring greater than 60 mm and less than 90 mm; a driver blade attached to the piston for movement therewith along a driving axis from the TDC position toward the BDC position for driving a fastener into a workpiece, the driver blade including, a first end, a second end, and a plurality of drive teeth extending from one side between the first end and the second end; a lifter operable to move the piston and driver blade from the BDC position toward the TDC position, wherein the lifter includes a body and a plurality of drive pins supported upon the body, wherein each of the drive pins is configured to engage one of the drive teeth; a drive unit operably coupled to the lifter to provide torque thereto, causing the lifter to rotate; a canister magazine coupled to the nosepiece in which collated fasteners are receivable; and a fastener delivery mechanism disposed adjacent the nosepiece for individually transferring collated fasteners in the canister magazine to a driver channel in the nosepiece.

In some aspects, the techniques described herein relate to a powered fastener driver including: a housing; a nosepiece extending from the housing; a workpiece contact bracket at least partially surrounding the nosepiece, wherein the workpiece contact bracket is movable relative to the nosepiece; an inner cylinder within the housing; a piston movable within the inner cylinder from a top-dead-center (TDC) position to a driven or bottom-dead-center (BDC) position, the piston having a stroke length of the piston between the TDC position and the BDC position measuring greater than 60 mm and less than 90 mm; a driver blade attached to the piston for movement therewith along a driving axis from the TDC position toward the BDC position for driving a fastener into a workpiece, the driver blade including, a first end, a second end, a plurality of drive teeth extending from one side between the first end and the second end, and an actuator tooth; a lifter operable to move the piston and driver blade from the BDC position toward the TDC position, wherein the lifter includes a body and a plurality of drive pins supported upon the body, wherein each of the drive pins is configured to engage one of the drive teeth; a drive unit operably coupled to the lifter to provide torque thereto, causing the lifter to rotate; and a fastener delivery mechanism disposed adjacent the nosepiece, wherein the fastener delivery mechanism is actuated by the actuator tooth on the driver blade as the driver blade is returned to a ready position to load a fastener into the nosepiece.

In some aspects, the techniques described herein relate to a powered fastener driver including: a housing; an inner cylinder within the housing; a piston movable within the inner cylinder from a top-dead-center (TDC) position to a driven or bottom-dead-center (BDC) position, the piston having a stroke length of the piston between the TDC position and the BDC position measuring greater than 60 mm and less than 90 mm; a driver blade attached to the piston for movement therewith along a driving axis from the TDC position toward the BDC position for driving a fastener into a workpiece, the driver blade including, a first end, a second end, and a plurality of drive teeth extending from one side between the first end and the second end, the first end being cylindrical and defining a striker face that is configured to strike and drive a fastener; a lifter operable to move the piston and driver blade from the BDC position toward the TDC position, wherein the lifter includes a body and a plurality of drive pins supported upon the body, wherein each of the drive pins is configured to engage one of the drive teeth; and a drive unit operably coupled to the lifter to provide torque thereto, causing the lifter to rotate.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
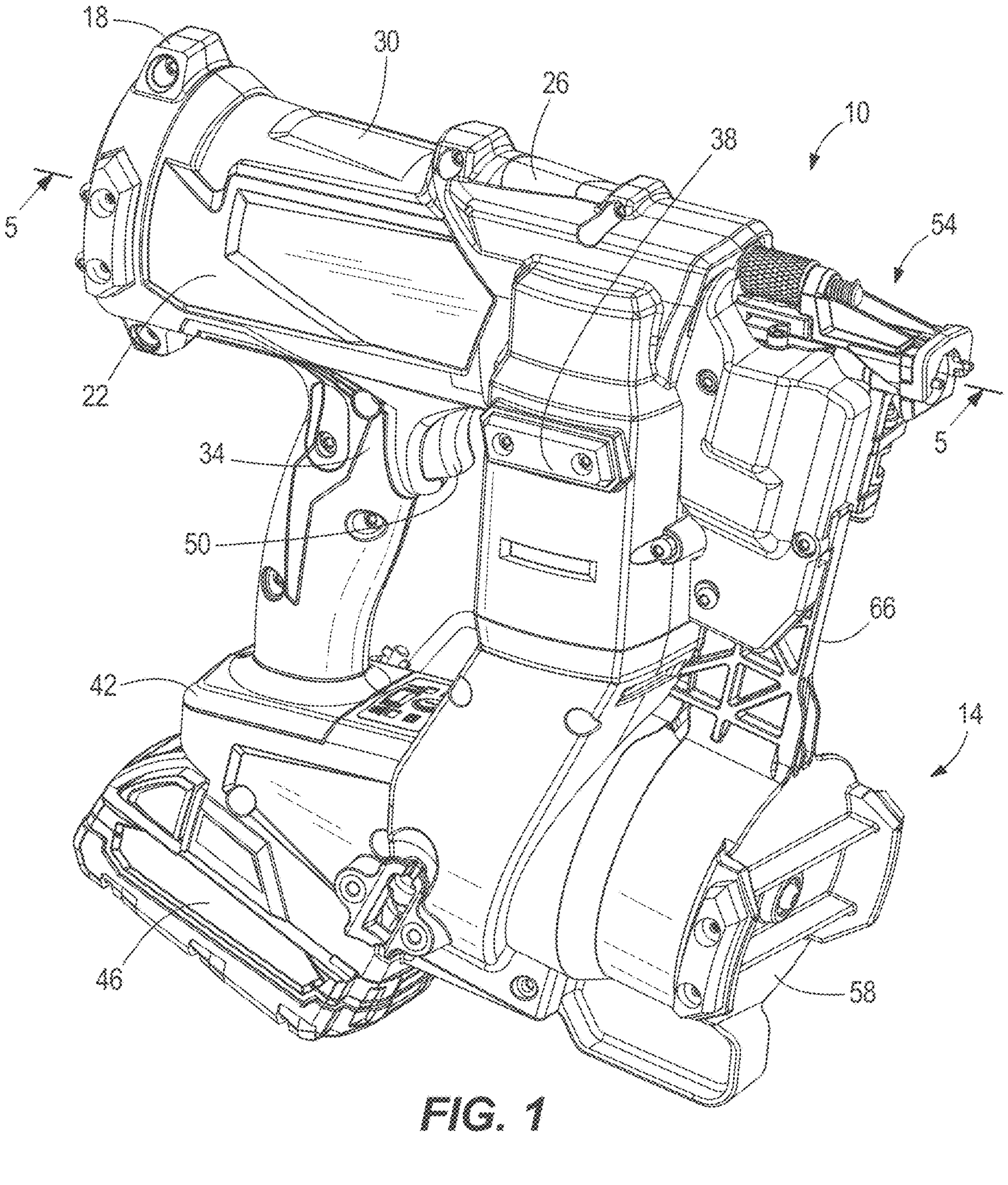
FIG. 1 is a perspective view of a gas spring-powered fastener driver in accordance with an embodiment of the invention.

With reference to FIG. 1, a gas spring-powered fastener driver 10 is operable to drive fasteners (e.g., nails) held within a canister magazine 14 into a workpiece. The fastener driver 10 includes a housing 18 having a first housing shell 22 joined to a second housing shell 26. The housing 18 includes a head portion 30 having a handle portion 34 and a drive unit housing portion 38 extending therefrom. The housing 18 also includes a battery receptacle portion 42 that extends from the handle portion 34 and is sized and shaped to receive a removable battery pack 46. As shown, the fastener driver 10 further includes a trigger 50 that extends outwardly from the handle portion 34 of the housing 18. Further, the magazine 14 extends from a nosepiece 54 that is coupled to and extends from the housing 18.

Figure 2:
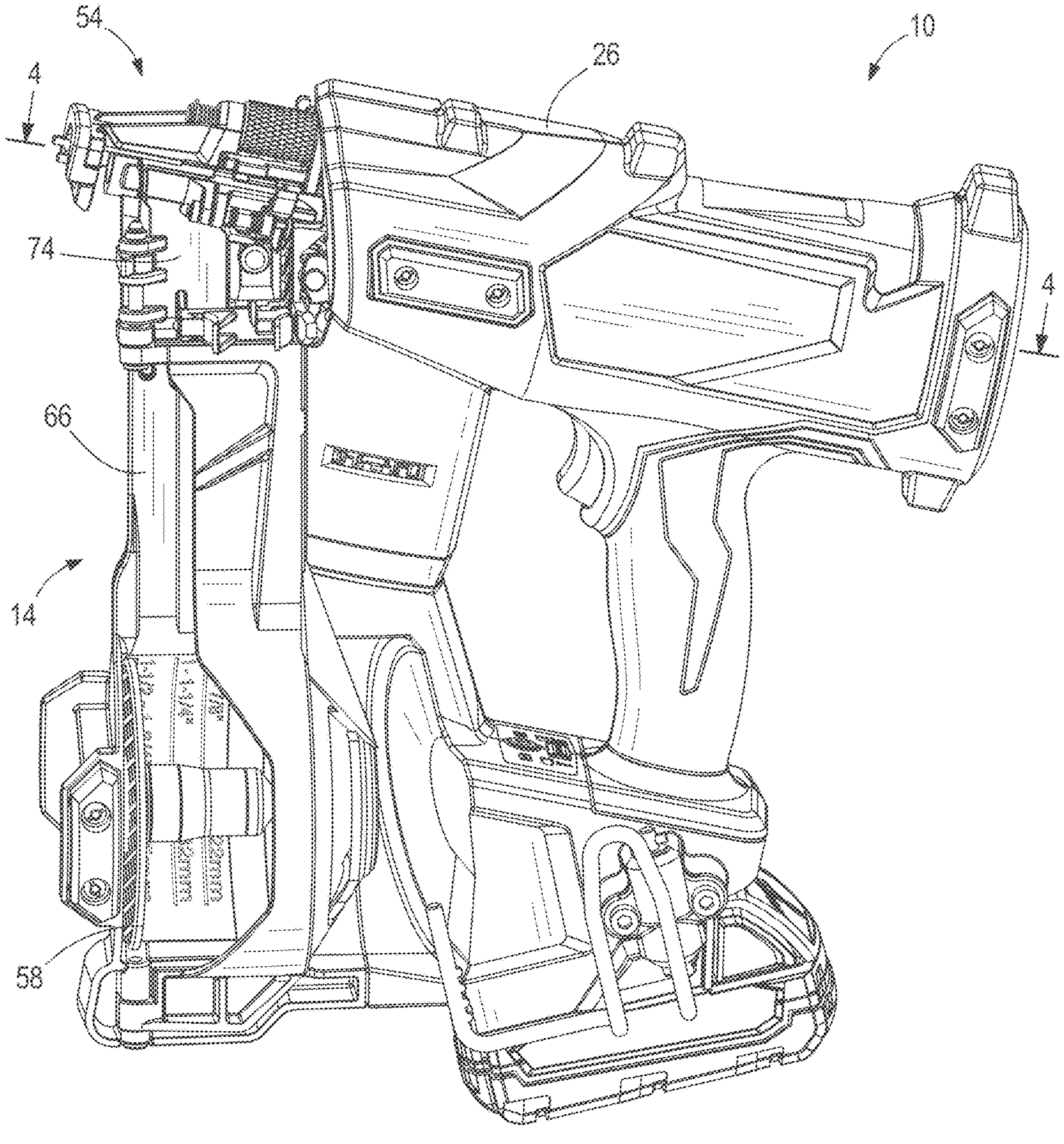
FIG. 2 is a side view of the gas-spring powered fastener driver of FIG. 1.

With reference to FIGS. 1 and 2, the magazine 14 includes a cannister portion 58 in which collated fasteners are arranged in a coil. The magazine 14 also includes a straight or linear portion 66 that is coupled to a nosepiece 54 of the fastener driver 10. The fasteners are sequentially transferred from the cannister portion 58, through the linear portion 66, and into a driver channel 70 (FIG. 4) within the nosepiece 54 by a fastener delivery mechanism 74.

Figure 3:
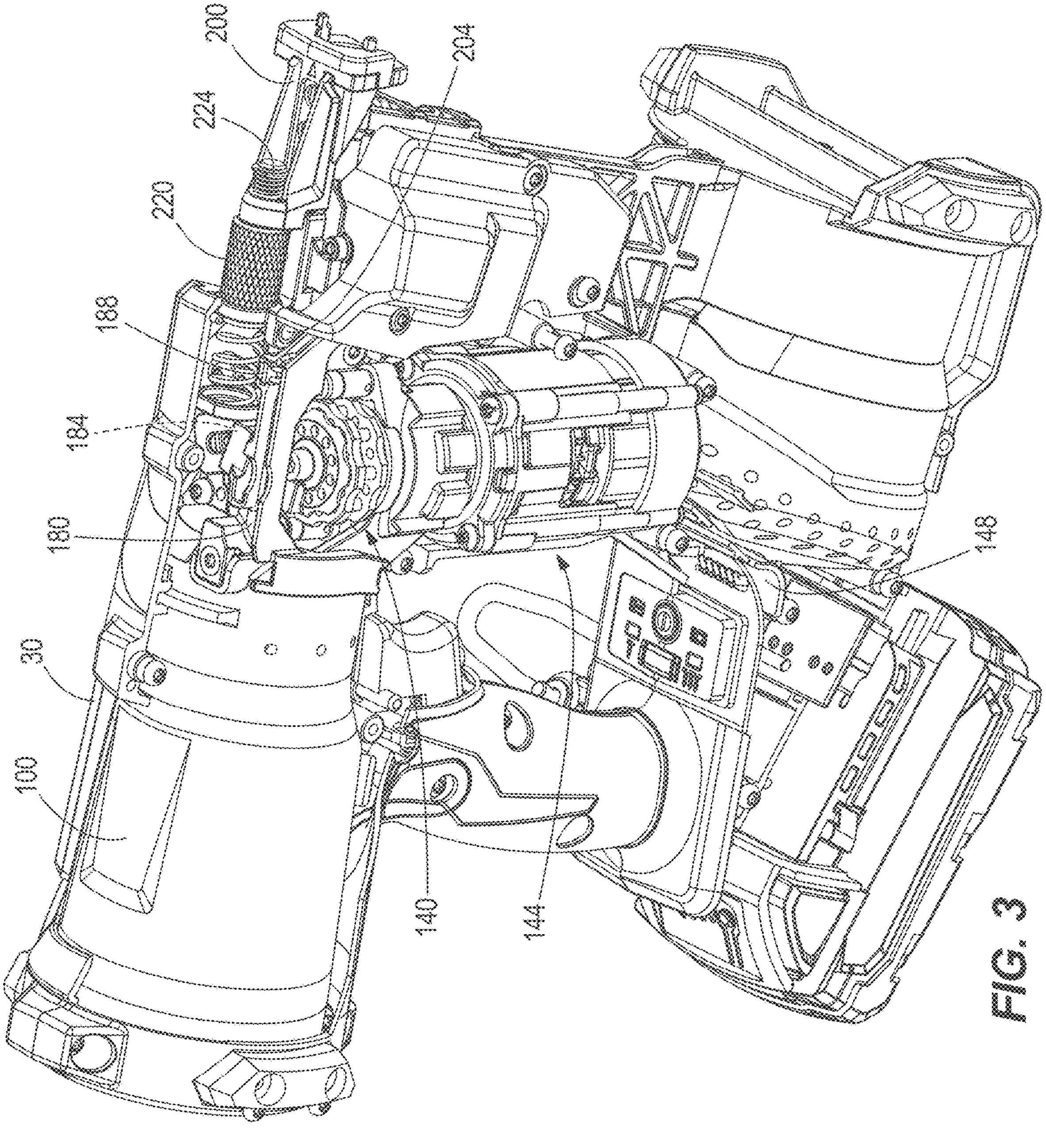
FIG. 3 is another perspective view of a portion of the gas spring-powered fastener driver of FIG. 1, with a portion removed for clarity.
Figure 4:
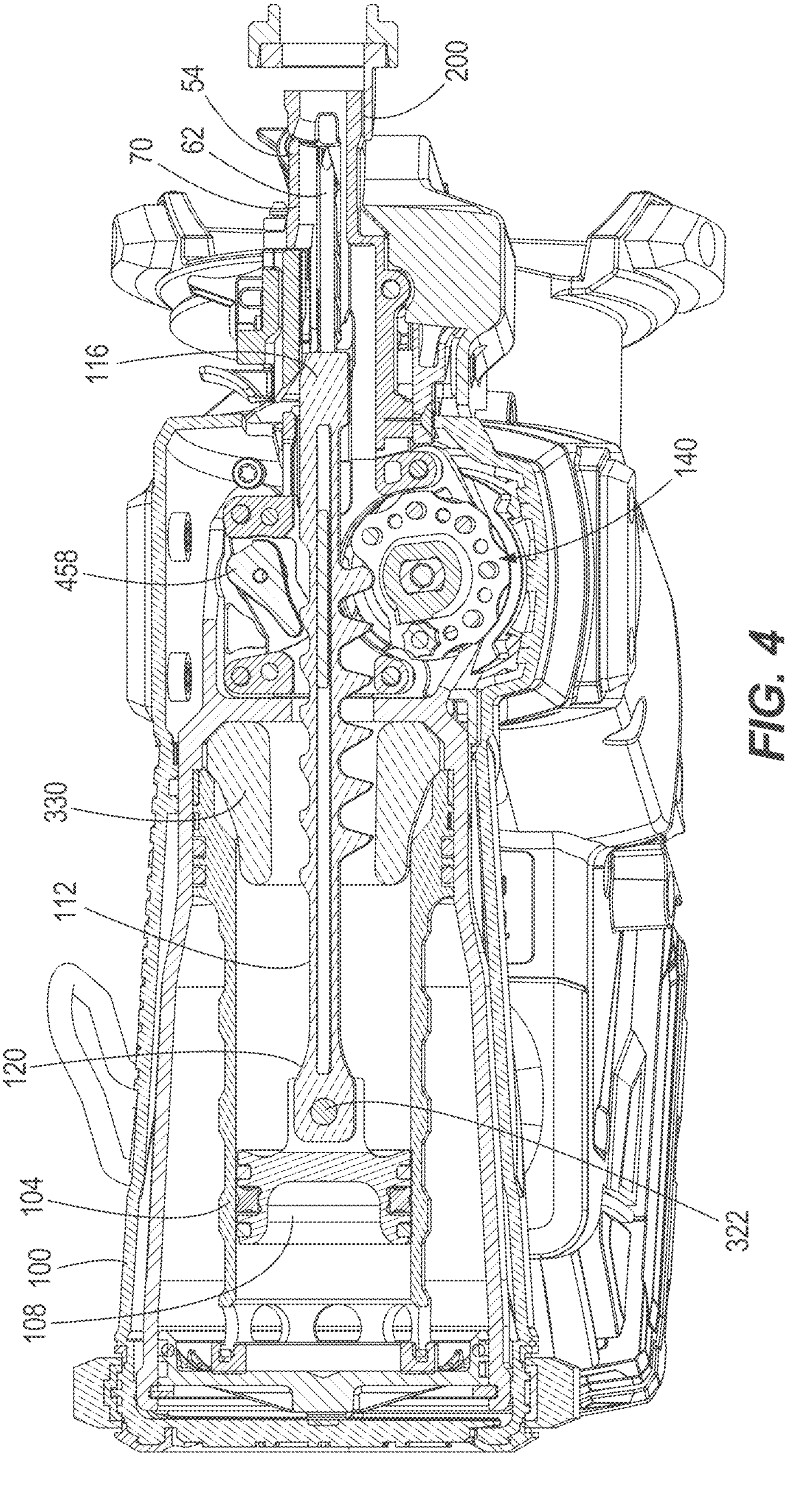
FIG. 4 is a cross-sectional view of the gas spring-powered fastener driver of FIG. 1 along the line 4-4 of FIG. 2.

FIGS. 3-4 illustrate the internal components of the fastener driver 10. As shown, the fastener driver 10 includes a storage chamber cylinder 100 disposed within the head portion 30 of the housing 18. A driver cylinder 104 is positioned within the storage chamber cylinder 100, and a moveable piston 108 is positioned within the driver cylinder 104. The fastener driver 10 further includes a driver blade 112 that is attached to the piston 108 and moveable therewith. The driver blade 112 includes a first end 116 and a second end 120 opposite the first end 116. The first end 116 is a free end and the second end 120 is coupled to the piston 108.

The fastener driver 10 does not require an external source of air pressure, but rather the storage chamber cylinder 100 includes pressurized gas in fluid communication with the driver cylinder 104. The driver 10 further includes a fill valve assembly 124 (FIG. 5) coupled to the storage chamber cylinder 100. When connected with a source of compressed gas, the fill valve assembly 124 permits the storage chamber cylinder 100 to be refilled with compressed gas if any prior leakage has occurred. The fill valve assembly 124 may be configured as a Schrader valve, a Presta valve, a Dunlop valve, or some other similar valve.

The piston 108, the driver cylinder 104, the storage chamber cylinder 100 collectively operate as a drive mechanism for driving the driver blade 112. In other embodiments, the drive mechanism can include a pneumatic drive mechanism powered by pressurized air from an external source, e.g., an air compressor or tank. Further, the drive mechanism may be powered by a flywheel, another mechanical device, or another source.

Figure 5:
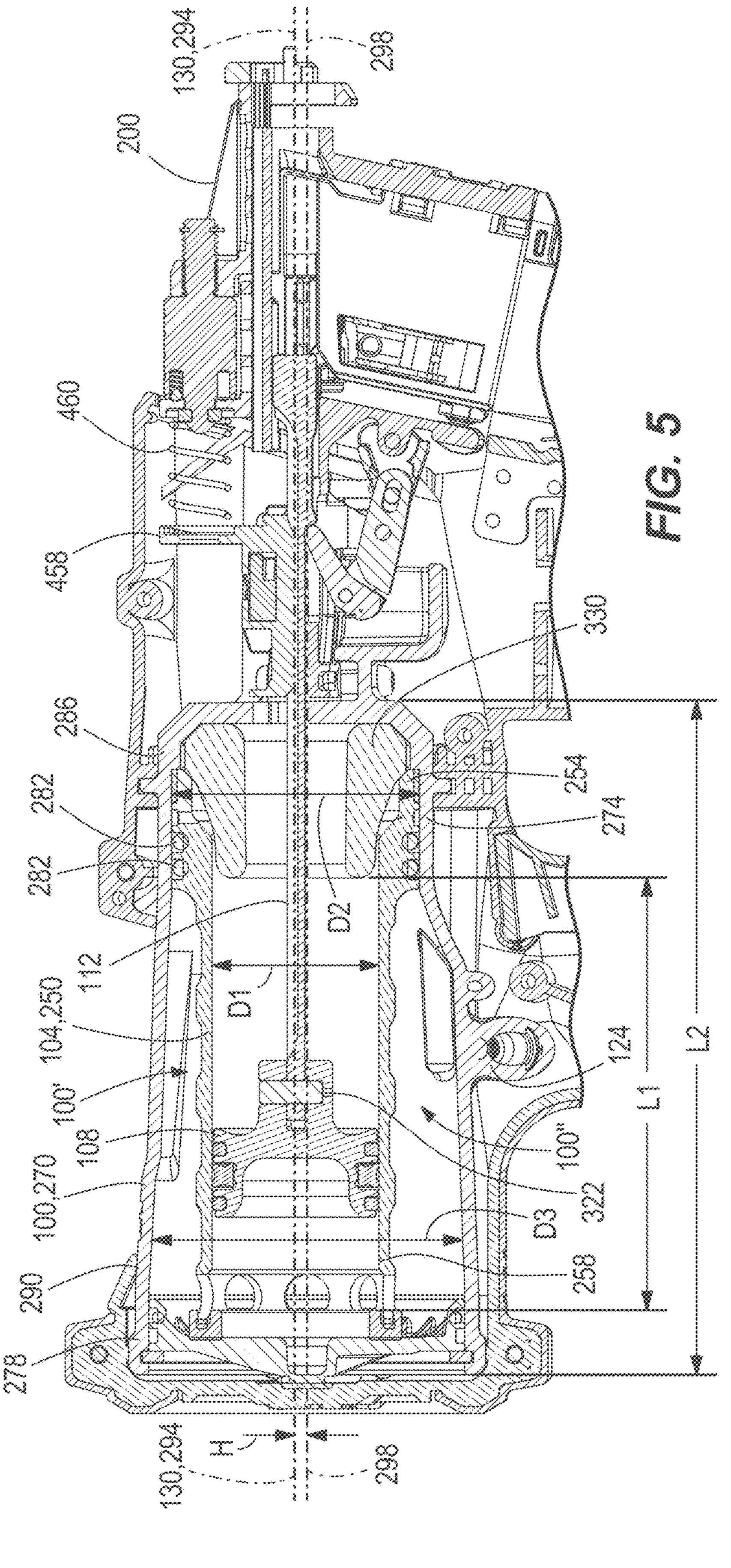
FIG. 5 is a cross-sectional view of the gas spring-powered fastener driver of FIG. 1 along the line 5-5 of FIG. 1.

With reference to FIG. 5, the driver cylinder 104 and the driver blade 112 define a driving axis 130. During a driving cycle the driver blade 112 and the piston 108 are moveable between a top-dead-center ("TDC") (i.e., retracted or ready) position and a bottom-dead-center ("BDC") (i.e., extended or driven) position. In the illustrated embodiment, a stroke length L1 of the driver blade 112 between the TDC and the BDC positions measures approximately 70 mm (e.g., 2.8 inches), which is less than conventional drivers. In some embodiments, the stroke length may measure between less than approximately 65 mm (e.g., 2.5 inches) and greater than approximately 90 mm (e.g., 3.5 inches). For example, in some embodiments, the stroke length may measure between 60 mm and 90 mm. In other embodiments, the stroke length L1 may measure between approximately 67 mm (e.g., 2.6 inches) and approximately 85 mm (e.g., 3.3 inches). In some embodiments, the stroke length L1 is approximately 73 mm or less. The term approximately as used herein means plus or minus 5% of the stated value. The reduced stroke length L1 is achievable for various as reasons, as discussed in greater detail below. As shown in FIG. 3, the fastener driver 10 further includes a lifting mechanism 140, which is powered by a motor 144, and which is operable to move the driver blade 112 from the BDC position toward the TDC position.

Also, the fastener driver 10 includes a circuit board 148 (FIG. 3) that controls the operation of the fastener driver 10. The circuit board 148 is electrically connected to the battery receptacle portion 42 and the battery pack 46 when engaged therewith and provides DC power to the motor 144 (e.g., a brushless direct current (BLDC) motor).

In operation, the lifting mechanism 140 drives the piston 108 and the driver blade 112 toward the TDC position along the driving axis 130 by energizing the motor 144. As the piston 108 and the driver blade 112 are driven toward the TDC position, the gas above the piston 108 and the gas within the storage chamber cylinder 100 is compressed. Just prior to reaching the TDC position, the motor 144 is deactivated, stopping the piston 108 and the driver blade 112 in a "ready" position where the piston 108 and driver blade 112 are held until released by user activation of the trigger 50. The first end of the driver blade 112 is located adjacent the nosepiece 54 when the piston 108 is moved to a top dead center (TDC) (i.e., retracted or ready) position within the driver cylinder 104 and the fastener driver 10 is ready to be fired. When released, the compressed gas above the piston 108 and within the storage chamber cylinder 100 drives the piston 108 and the driver blade 112 to the BDC position along the driving axis 130, thereby driving a fastener 62 into a workpiece. Upon firing, the first end 116 of the driver blade 112 is moved into the nosepiece 54 to drive the fastener 62 from within the driver channel 70 of the nosepiece 54 and into a workpiece until the piston 108 reaches a bottom dead center (BDC) (i.e., extended or driven) position within the driver cylinder 104. The illustrated fastener driver 10 therefore operates on a gas spring principle utilizing the lifting mechanism 140 and the piston 108 to compress the gas within the driver cylinder 104 and the storage chamber cylinder 100 in preparation for a fastener driving cycle.

Moreover, as described in greater detail below, a latch actuator assembly 160 (FIG. 11) cooperates with the lifting mechanism 140 to selectively engage the driver blade 112 and hold the driver blade 112 in the ready position before the latch actuator assembly 160 is actuated by the lifting mechanism 140 to release the driver blade 112 into the nosepiece 54 to drive a fastener from the fastener driver 10 and into a workpiece.

As depicted in FIG. 3, the fastener driver 10 further includes a sensor bracket 180 disposed at least partially above the lifting mechanism 140. The sensor bracket 180 includes a first sensor 184 configured to sense an angular (or rotational) position of the lifting mechanism 140 and a second sensor 188 to sense a linear position of a workpiece contact bracket 200 that is slidably disposed on the nosepiece 54. For example, the sensors 184, 188 are Hall effect sensors that are configured to sense magnets or the presence of magnetic fields. The workpiece contact bracket 200 includes a magnet 204 that is sensed by the second sensor 188 when the workpiece contact bracket 200 is engaged with a workpiece and slides on the nosepiece 54. When the magnet 204 is sensed, the fastener driver 10 is allowed to fire.

As shown in FIG. 3, the fastener driver 10 includes a depth adjuster 220 having a threaded shaft 224 that is threadably engaged with the workpiece contact bracket 200. The depth adjuster 220 is rotatable to change a linear position of the workpiece contact bracket 200 relative to the nosepiece 54. This changes the depth to which a fastener expelled from the fastener driver 10 is driven into a workpiece.

With reference to FIG. 5, the driver cylinder 104 has an annular inner wall 250 configured to guide the piston 108 and driver blade 112 along the driving axis 130 to compress the gas in the storage chamber cylinder 100. The annular inner wall 250 includes a first end 254 and a second end 258 opposite the first end 254. The annular inner wall 250 has a first inner diameter D1 that is generally constant between the first end 254 and the second end 258. The first diameter D1 may measure between approximately 33 mm to approximately 45 mm. In the illustrated embodiment the first diameter measures approximately 37 mm.

With continued reference to FIG. 5, the storage chamber cylinder 100 has an annular outer wall 270 circumferentially surrounding the inner wall 250. More specifically, the storage chamber cylinder 100 extends from a first end 274 to a second end 278. Each of the illustrated first and second ends 274, 278 of the storage chamber cylinder 100, respectively, are circular. The first end 254 of the driver cylinder 104 is affixed to the first end 274 of the storage chamber cylinder 100. The first ends 254, 274 may be affixed in any suitable manner (e.g., press-fit engagement, threaded engagement, etc.). A seal 282 is disposed between the first end 254 of the driver cylinder 104 and the first end 274 of the storage chamber cylinder 100. The seal 282 prevents pressurized gas from escaping between the storage chamber cylinder 100 and the driver cylinder 104.

The storage chamber cylinder 100 includes a first portion 286 and a second, portion 290 adjacent the first portion 286. The first portion 286 is adjacent the first end 274, and has a second inner diameter D2 that is generally constant. The first portion 286 defines a first longitudinal axis 294 that is co-linear with the driving axis 130. The second portion 290 is adjacent the second end 278. The second portion 290 extends from the first portion 286 toward the second end 278. The second end 278 has a third inner diameter D3 that is variable along a length of the second portion 290 between the first portion 286 and the second end 278. As shown, the third diameter D3 generally increases from the first portion 286 to the second end 278. The second portion 290 defines a second longitudinal axis 298 coaxial with the second end 278. In other words, the second end 278 defines the second longitudinal axis 298 that extends through a center of the second end 278. The second longitudinal axis 298 extends parallel to and spaced from the driving axis 130 (e.g., the second longitudinal axis 298 is radially below the first longitudinal axis 294/driving axis 130 from the frame of reference of FIG. 5). As shown, in the illustrated embodiment, the second longitudinal axis 298 is generally closer to the handle portion 34 than the driving axis 130 and first longitudinal axis 294. The first and second longitudinal axes 294, 298, respectively, are offset. Accordingly, the storage chamber cylinder 100 is non-concentric with the driver cylinder 104. Moreover, as shown, the storage chamber cylinder 100 has a volume. A first portion 100' of the volume is defined generally on a first side of the driving axis 130 and a second portion 100" of the volume is defined generally on a second, opposite side of the driving axis 130. The second portion 100" has a greater volume than the first portion 100'. The driver 10 further includes an end cap 302 positioned at the second end 278. The end cap 302 fluidly seals the driver cylinder 104 and the storage chamber cylinder 100 from the outside atmosphere.

The second longitudinal axis 298 is spaced from the first longitudinal axis 294 by an offset distance H. The offset distance H between the first longitudinal axis 294 and the second longitudinal axis 298 is between approximately 3% and approximately 25% of the third diameter D3 at the second end 278. In some embodiments, the offset distance H is between approximately 3% and approximately 20% of the third diameter D3 at the second end 278. In further embodiments, the offset distance H is between approximately 3% and approximately 15% of the third diameter D3 at the second end 278. In yet further embodiments, the offset distance H is between approximately 3% and approximately 10% of third diameter D3 at the second end 278. In the illustrated embodiment, the offset distance H is approximately 3.5% of the third diameter D3 at the second end 278.

The non-concentric configuration of the driver cylinder 104 and the storage chamber cylinder 100 may reduce an overall size of the driver 10, and may facilitate positioning of the driver 10 in tight spaces during use of the driver 10. Specifically, an overall height of the driver 10 may be reduced as compared to conventional drivers. In addition, this configuration shifts the center of mass of the cylinders 104, 100 closer to the second end 278 where the handle portion 34 of the driver 10 is located (FIGS. 1-2), which may improve the balance and/or handling of the driver 10 while in use. Also, a length L2 of the storage chamber cylinder 100 may be less than the length of the storage chamber cylinders of conventional drivers. In the illustrated embodiment, the length L2 measures approximately 148 mm. In other embodiments, the length L2 of the storage chamber cylinder 100 between the first and second ends 274, 278 may range from approximately 125 mm to 180 mm. Additionally, the non-concentric configuration of the driver cylinder 104 and the storage chamber cylinder 100 is one of the factors that enables the stroke length L1 of the driver blade 112 to be reduced. This is because, despite the smaller footprint of the driver 10, the storage chamber cylinder 100 can still accommodate the necessary amount of gas. The amount of pressurized gas may range from approximately 134 $cm^3$ to approximately 420 $cm^3$. In the illustrated embodiments, the amount of pressurized gas may be approximately 270 $cm^3$. Therefore, while the stroke length L1 is reduced and footprint of the driver is reduced, the large volume of the storage chamber cylinder 100 still enables a pressure of the pressurized gas to exert a striker force of 245 lbf at TDC in the illustrated embodiment. In other embodiments, while the stroke length L1 is reduced and footprint of the driver is reduced, the large volume of the storage chamber cylinder 100 still enables a pressure of the pressurized gas to exert a striker force of 100 lbf to 410 lbf at TDC. In other embodiments, while the stroke length L1 is reduced and footprint of the driver is reduced, the large volume of the storage chamber cylinder 100 still enables a pressure of the pressurized gas to exert a striker force of 200 lbf to 300 lbf on the piston 108 at TDC. In other embodiments, while the stroke length L1 is reduced and footprint of the driver is reduced, the large volume of the storage chamber cylinder 100 still enables a pressure of the pressurized gas to exert a striker force of greater than 200 lbf on the piston 108 at TDC. This allows for a favorable compression ratio of no more than approximately 1.38:1 in the illustrated embodiment. In some embodiments, the compression ratio may be up to approximately 1.6:1. Moreover, the low compression ratio reduces the lifting shear stress a lifter 380 of the lifting mechanism 140 experiences during operation.

Figure 6:
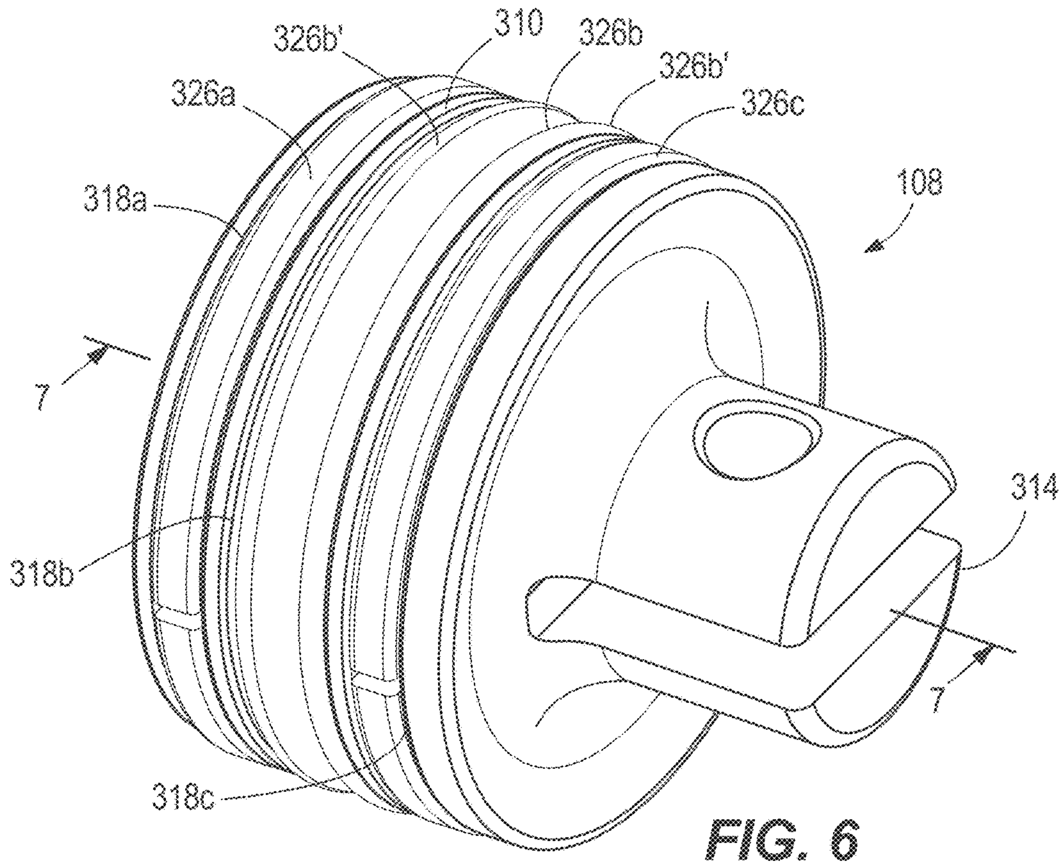
FIG. 6 is a perspective view of a piston of the gas spring-powered fastener driver of FIG. 1.
Figure 7:
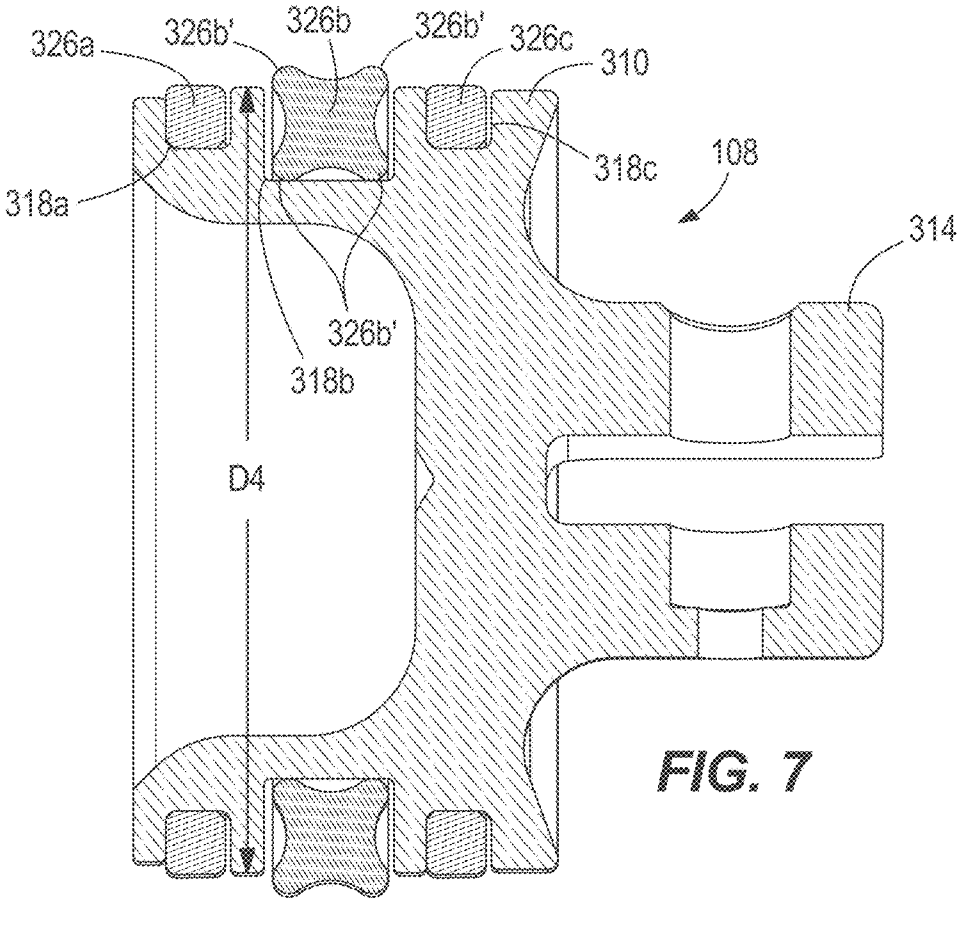
FIG. 7 is a cross-sectional view of the piston f FIG. 6 along the line 7-7 of FIG. 6.

With respect to FIG. 6-7, in the illustrated embodiment, the piston 108 includes a first portion 310 and a second portion 314 that is integrally formed with or otherwise coupled to the first portion 310. The first portion 310 defines a plurality of groove 318*a*, 318*b*, 318*c* (e.g., circumferential grooves) that each extend about a circumference thereof. In the illustrated embodiment, the second groove 318*b* has a greater depth than the first and third grooves 318*a*, 318*c*. In the illustrated embodiment, the second portion 314 is integrally formed with the first portion 310. In some embodiments, the second portion 314 may be coupled to the first portion 310 via threaded engagement or via a fastener. The second portion 314 is coupled to the driver blade 112. In the illustrated embodiment, the driver blade 112 is coupled to the piston 108 via a fastener 322 (e.g., a pin, FIGS. 4 and 5), but in other embodiments, the driver blade 112 may be coupled to the piston in other ways (e.g., a threaded engagement).

In the illustrated embodiment, the piston 108 includes a smaller diameter compared to pistons in other gas spring-powered fastener drivers. The first portion 310 defines a maximum diameter D4 of the piston 108. A diameter of the second portion 314 is generally less than the diameter of the first portion 310, in the illustrated embodiment. Due to the reduced size of the piston 108 (e.g., the first portion 310 thereof), the pressure of the compressed gas necessary to move the piston 108 and driver blade 112 from the TDC position to the BDC position with sufficient force to adequately drive a nail into a workpiece increases.

The second groove 318*b* of the first portion 310 receives a seal ring 326*b* therein, which seals the piston 108 relative to the driver cylinder 104. As shown, the seal ring 326*b* is configured as a "quad ring." When configured as a quad ring, the seal ring 326*b* includes a cross-sectional shape having four lobes 326*b*', with adjacent lobes 326*b*' being equidistantly spaced. In other embodiments, the seal ring 326*b* may be an O-ring having a conventional cylindrical cross-section. Regardless of whether the quad ring or the O-ring is used, the seal ring 326*b* is made from an elastomer or plastic material having a material composition to reduce friction with the inner wall of the driver cylinder 104 during sliding contact therewith. Each of the O-ring and the quad ring preferably have a thickness of between approximately 2 mm and 5.5 mm. Additionally, each of the first and third grooves 318*a*, 318*c* include a guide ring 326*a*, 326*c*, as well. In the illustrated embodiment, the guide rings 326*a*, 326*c* are O-rings.

In the illustrated embodiments, the maximum diameter D4 measures approximately 37 mm (e.g., 1.5 inches). Thus, a total surface area of the piston 108 is approximately 1075 $mm^2$. In other embodiments, the maximum diameter D4 of the piston 108 measures less than approximately 45 mm and a total surface area exposed to the compressed gas in the driver cylinder 104 of less than approximately 1590 $mm^2$. Additionally, the pressure of the compressed gas necessary to move the piston 108 and the driver blade 112 from the TDC position to the BDC position with sufficient force to adequately drive the nail into the workpiece is at least approximately 102 psi, which is greater than the pressure of conventional gas spring drivers when the piston is at the TDC position. The non-concentric configuration of the storage chamber cylinder 100 and the driver cylinder 104 as well as the smaller diameter D4 of the piston 108 enables sufficient pressure to drive the piston 108 despite the reduced size of the driver 10, as a whole. Additionally, the thickness of the seal ring 326*b*, as well as the use of the guide rings 326*a*, 326*c* helps to reduce permeation that results from the increased internal pressure. Also, the thickness of the seal ring 326*b* increases the compression of the seal to approximately 10%, which is at least twice as high as the seals used in conventional drivers.

With reference to FIGS. 4-5, the driver 10 includes a bumper 330 positioned beneath the piston 108 for stopping the piston 108 at the driven or BDC position and absorbing the impact energy from the piston 108. The bumper 330 is configured to distribute the impact force of the piston 108 uniformly throughout the bumper 330 as the piston 108 is rapidly decelerated upon reaching the BDC position. The bumper 330 may be formed from any suitable elastic material (e.g., rubber).

Figure 8:
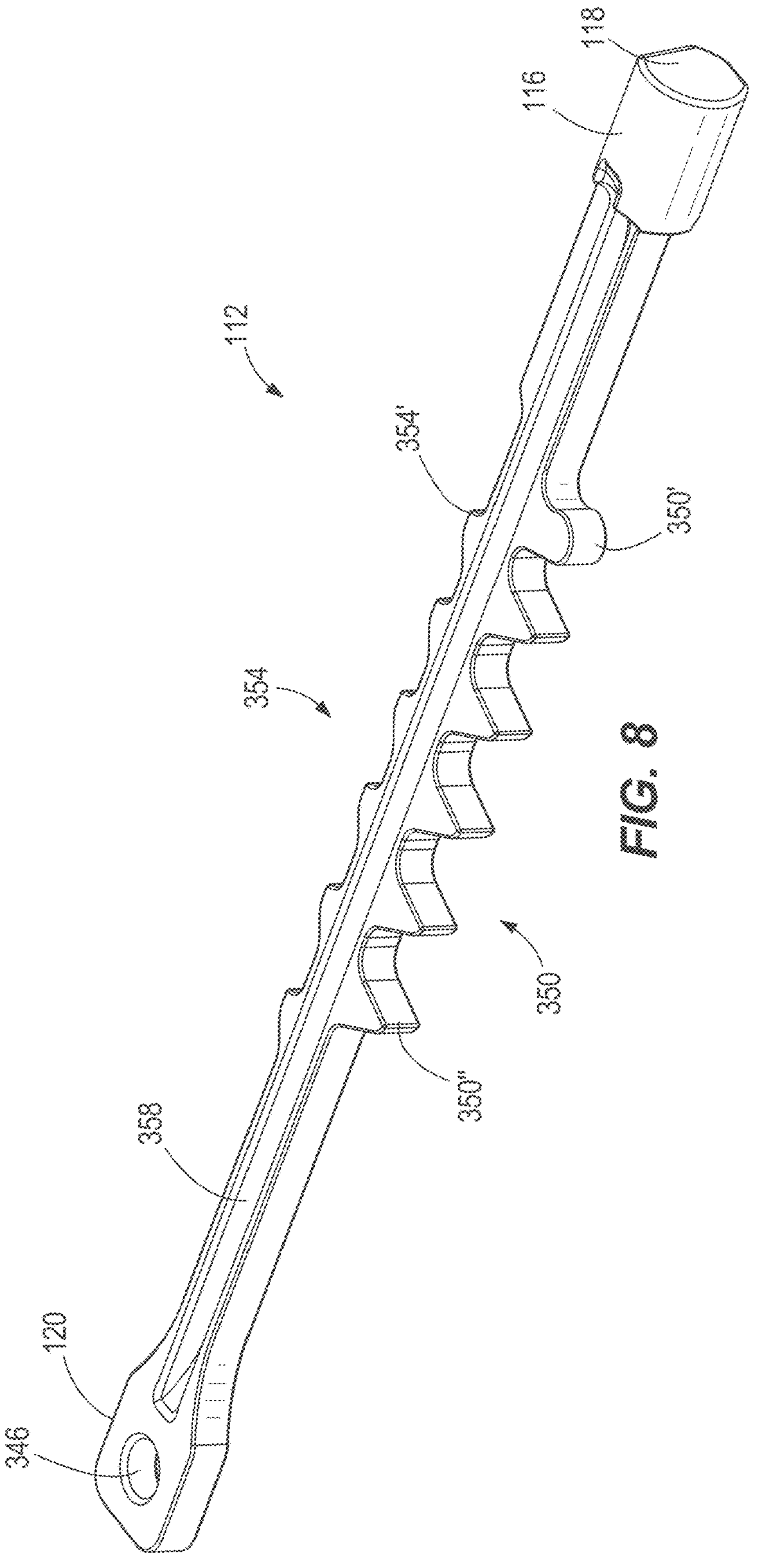
FIG. 8 is a perspective view of a driver blade of the gas spring-powered fastener driver of FIG. 1.
Figure 9:
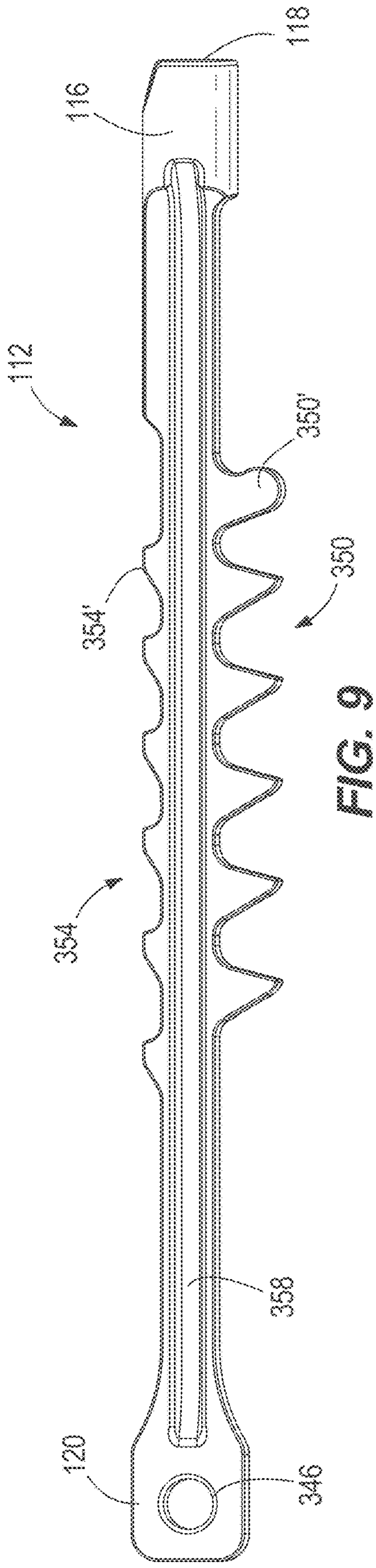
FIG. 9 is a plan view of a driver blade of the gas spring-powered fastener driver of FIG. 1.
Figure 10:
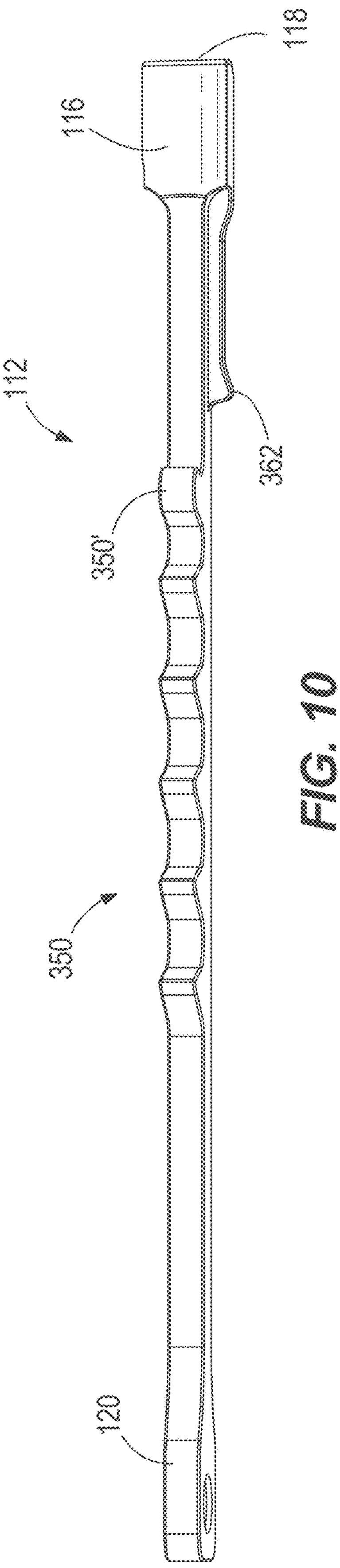
FIG. 10 is a side view of a driver blade of the gas spring-powered fastener driver of FIG. 1.

Referring to FIGS. 8-10, the details of the driver blade 112 are shown. As shown, the second end 120 includes a bore 346 that is sized and shaped to receive the pin 322 therethrough to attach the driver blade 112 to the piston 108. The driver blade 112 further includes a driver tip at the first end 116 of the driver blade 112. The driver tip is configured to strike and drive a fastener 62. The driver tip herein is generally cylindrical and defines a striking face 118 having a maximum dimension of 10 mm. In other embodiments, the maximum dimension of the striking face 118 may range from 5 mm to 15 mm.

The driver blade 112 includes a plurality of axially spaced drive teeth 350 on a first side of the driver blade 112 between the first end 116 and the second end 120 of the driver blade 112. As described in greater detail below, the drive teeth 350 are configured to engage the lifting mechanism 140 to move the driver blade 112 to the TDC (i.e., retracted or ready) position. The driver blade 112 also includes a plurality of axially spaced locking protrusions 354 on a second side of the driver blade 112, opposite the first side of the driver blade 112 and opposite the teeth 350, between the first end 116 and the second end 120 of the driver blade 112. As described in greater detail below, the locking protrusions 354 are configured to engage the latch actuator assembly 160 to hold the driver blade 112 in the TDC (i.e., retracted or ready) position prior to being released to the BDC (i.e., extended or driven) position. The driver blade 112 includes a guide groove 358 formed along the length of the driver blade 112 from the first end 116 to the second end 120. FIG. 10 further shows that the driver blade 112 includes an actuator tooth 362 extending from the driver blade 112 in a direction perpendicular to the drive teeth 350. The actuator tooth 362 actuates the fastener delivery mechanism 74 and loads a fastener into the nosepiece 54 as the driver blade 112 is returned to the TDC (i.e., retracted or ready) position after the fastener driver 10 is fired, as described in detail below.

Figure 11:
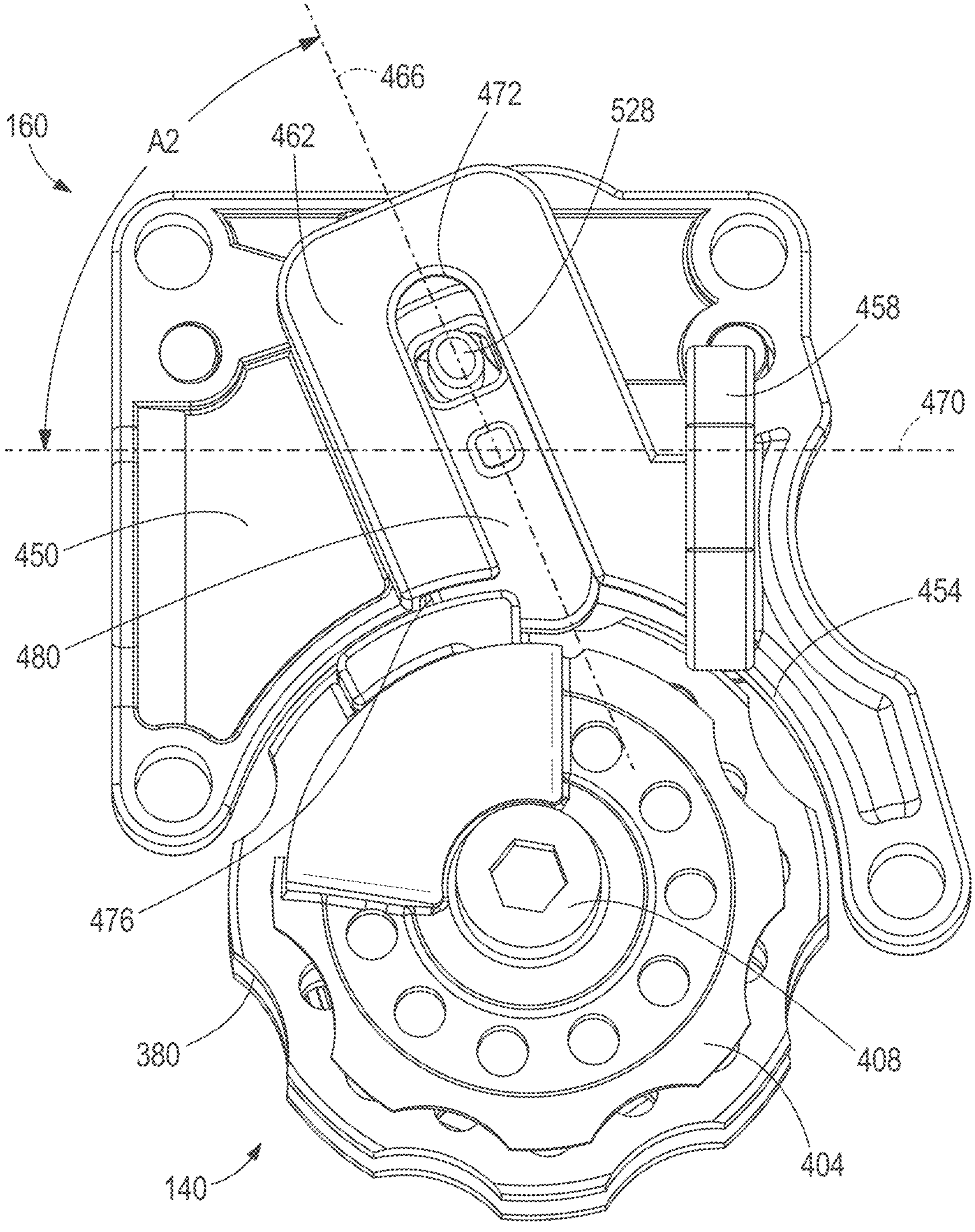
FIG. 11 is a plan view of a lifter mechanism and a latch actuator assembly of the gas spring-powered fastener driver of FIG. 1.
Figure 12:
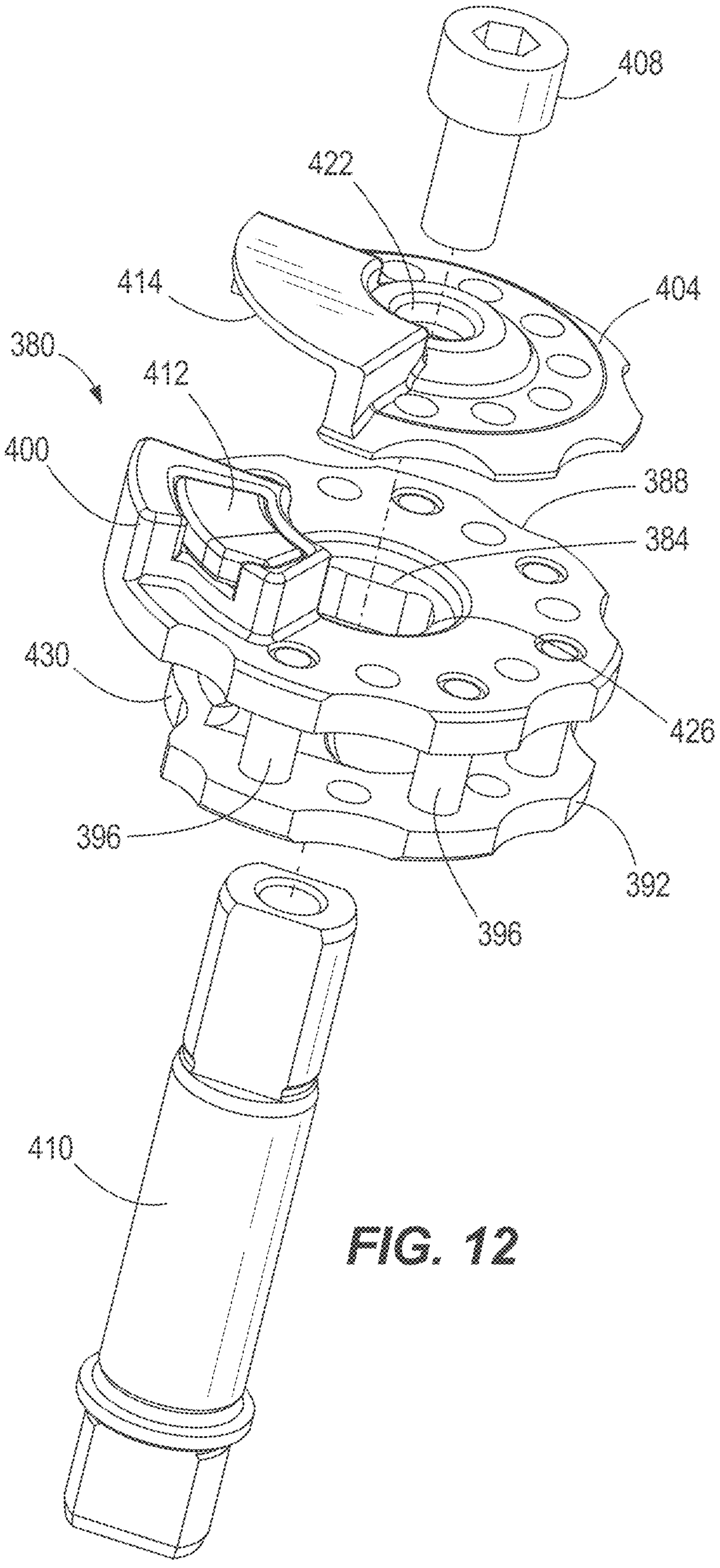
FIG. 12 is an exploded view of the lifter mechanism of FIG. 11.
Figure 13:
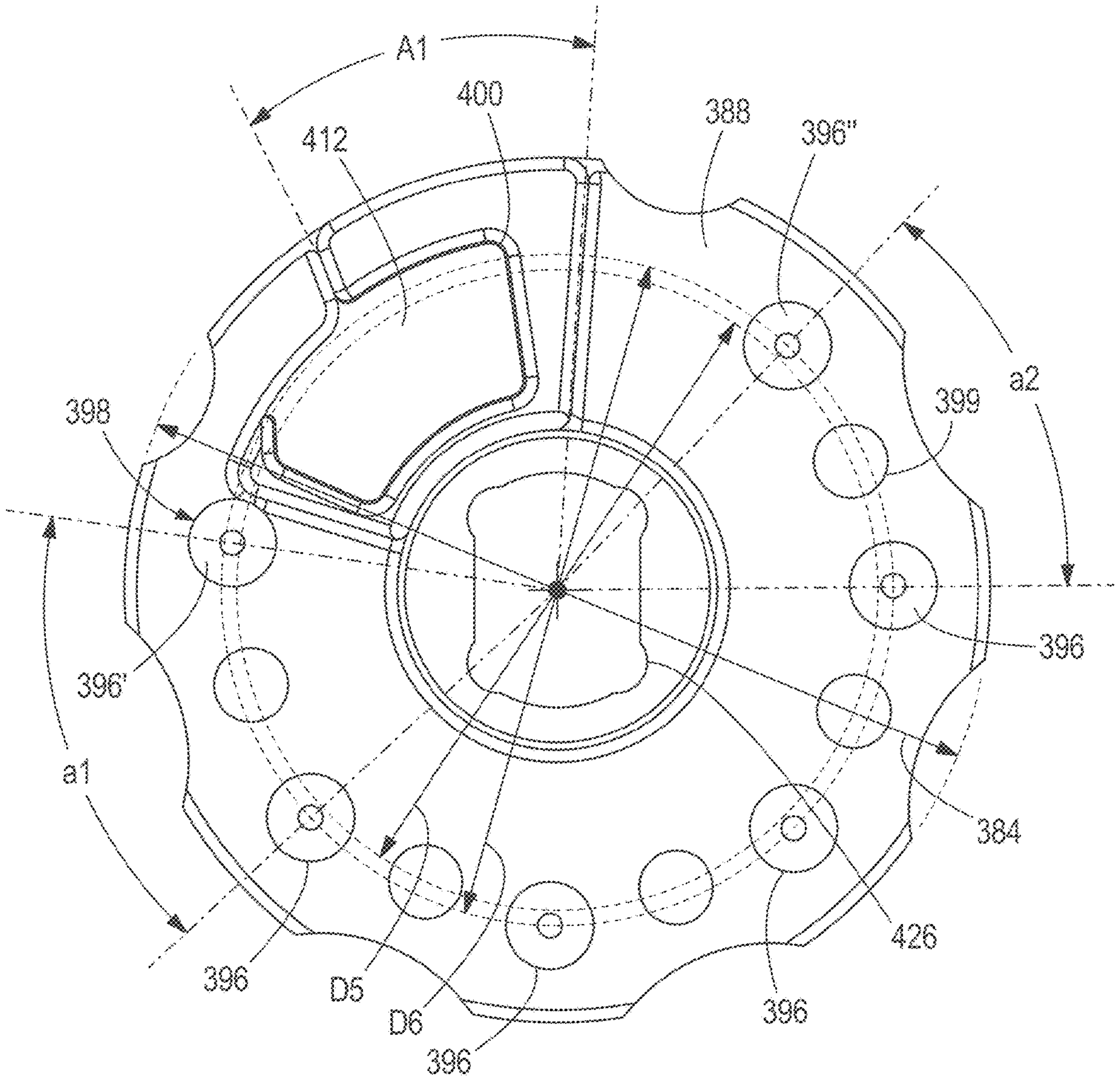
FIG. 13 is a plan view of the lifter mechanism of FIG. 11 with a portion removed.

FIGS. 11-13 depict the details of the lifting mechanism 140. As shown, the lifting mechanism 140 includes a lifter 380 having a body and a plurality of drive pins 396 supported upon the body. The body includes a central hub 384 with an upper disk 388 and a lower disk 392 extending radially outward from the central hub 384 and spaced axially apart from each other. The plurality of drive pins 396 is installed within the lifter 380. Each drive pin 396 is coupled to both the upper disk 388 and the lower disk 392. The drive pins 396 include a drive pin 396' that is configured to engage a drive tooth 350' that is closest to the first end 116 of the driver blade 112 (e.g., the lowermost drive tooth) in the ready position. With respect to FIG. 13, the drive pin 396' is oriented along an imaginary circle that is coaxial with the rotational axis of the lifter 380 and that has a fifth diameter D5, which in this case measures approximately 26.62 mm. In other embodiments, the fifth diameter D5 may be range from approximately 18 mm to 40 mm. The remaining drive pins 396 are oriented along an imaginary circle that is coaxial with the rotational axis of the lifter 380 and that has a sixth diameter D6, which is greater than the fifth diameter D5. In this case the sixth diameter measures approximately of 28.25 mm. In other embodiments, the fifth diameter D6 may be range from approximately 18 mm to 40 mm. Due to the reduced stroke length L1, the diameters D5 and D6 of the lifter 380 are also reduced relative to the lifters of conventional drivers. In the illustrated embodiment, there are six drive pins 396, each corresponding to an aperture 398 in the lifter 380. Additionally, there are apertures 390 positioned between adjacent drive pins 396. In the illustrated embodiment, there are five apertures 390. In other embodiments, there may more or fewer drive pins 396/apertures 398 and more or fewer apertures 399. In the illustrated embodiment, the drive pin 396' is positioned at an angle a1 of approximately 51 degrees relative to the adjacent drive pin 396. Additionally, the remaining drive pins 396 are positioned at an angle a2 of approximately 46 degrees relative to the adjacent drive pins 396. In other embodiments, these angles a1 and a2 may range from approximately 40 degrees to approximately 60 degrees. Although the lifter 380 includes the body and the drive pins 396 in the illustrated embodiment, in other embodiments, the lifter 380 may be an integrally formed piece.

The lifter 380 further includes a cam 400 extending in an upward direction from the upper disk 388. As described in detail below, the cam 400 is configured to actuate the latch actuator assembly 160. In particular the cam 400 is configured to engage and actuate the latch actuator assembly 160 over an angle A1 (FIG. 13). In a particular aspect, the angle A1 ranges from approximately 20 degrees to approximately 45 degrees. In the illustrated embodiment, the angle A1 measures approximately 25.3 degrees. It is to be understood that the angle A1 may be within a range between, and including, any of the maximum and minimum values of A1 disclosed herein.

A magnet retainer 404 is disposed adjacent the upper disk 388 and a bolt 408 extends through the magnet retainer 404 secures the lifting mechanism 140 to a drive shaft 410 of the motor 144 (FIG. 3). Further, a magnet 412 is disposed within a pocket 414 the magnet retainer 404 and the magnet 412 is detected by the first sensor 184 (FIG. 3) that disposed within the sensor bracket 180 (FIG. 3) to control the operation of the motor 144 (FIG. 3) and the lifting mechanism 140 operably coupled thereto. Accordingly, when the magnet retainer 404 is installed on the lifter 380 as shown in FIG. 12, the magnet 412 is nested within the cam 400. The bolt 408 extends through a bore 422 in the magnet retainer 404 and a bore 426 in the lifter 380 and is threadably engaged with the drive shaft 410 that is keyed to the bore 426 in the lifter 380 to prevent the lifter 380 from rotating with respect to the motor shaft.

Referring back to FIG. 12, the lower disk 392 of the lifter 380 is formed with a peripheral notch 430 below the radial location of the cam 400 on the upper disk 388 of the lifter 380 such that the peripheral notch 430 overlaps the cam 400 in an axial direction. As described in detail below, the peripheral notch 430 provides clearance for the driver blade 112 when the fastener driver 10 is fired and the driver blade 112 is moved to the BDC (i.e., extended or driven) position into the nosepiece 54 to forcibly eject a fastener therefrom and into a workpiece.

Figure 14:
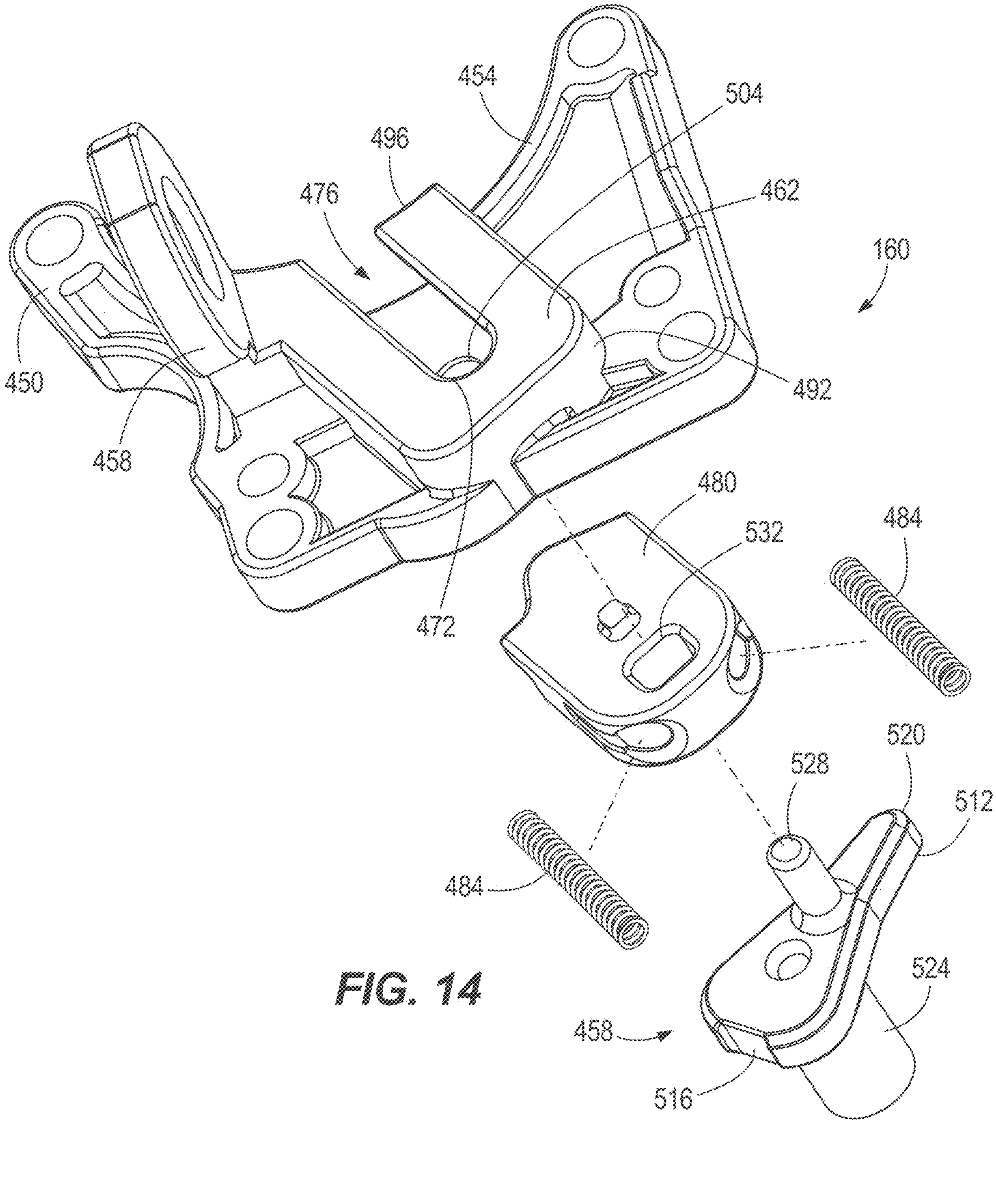
FIG. 14 is an exploded view of the latch actuator assembly of FIG. 11.
Figure 15:
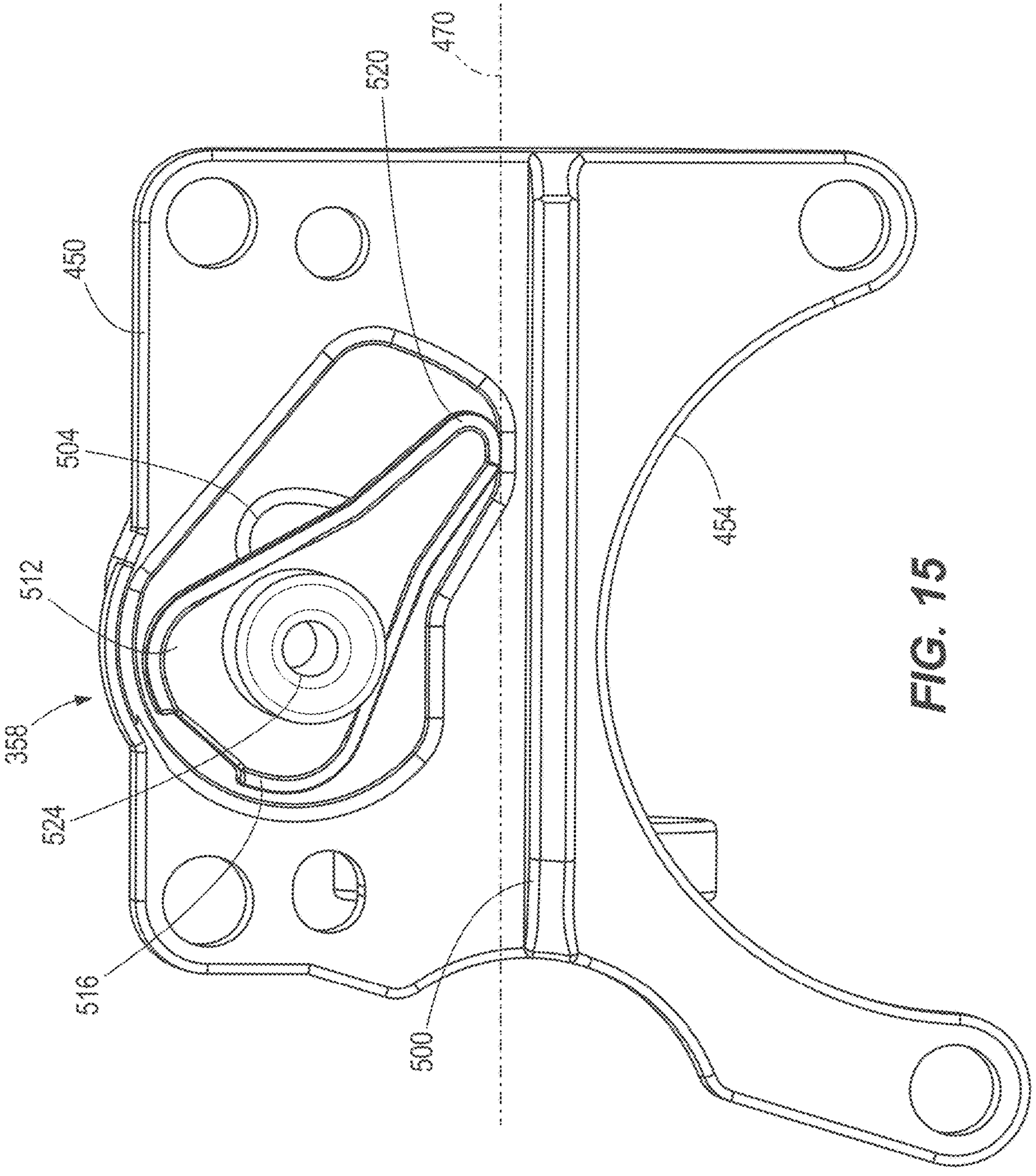
FIG. 15 is a plan view of the latch actuator assembly of FIG. 11.
Figure 16:
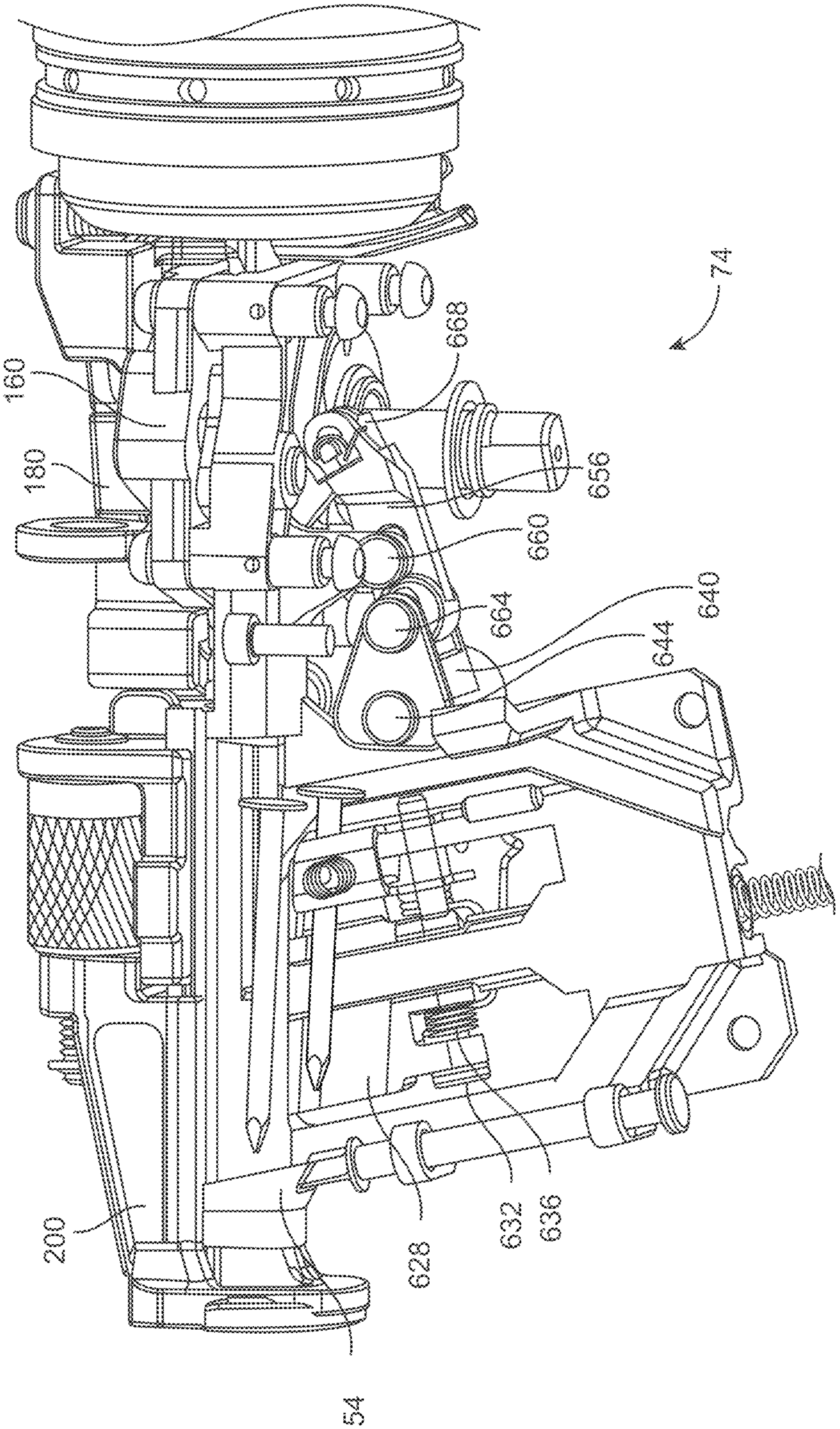
FIG. 16 is a left side view of a fastener delivery mechanism of the fastener driver of FIG. 1.
Figure 17:
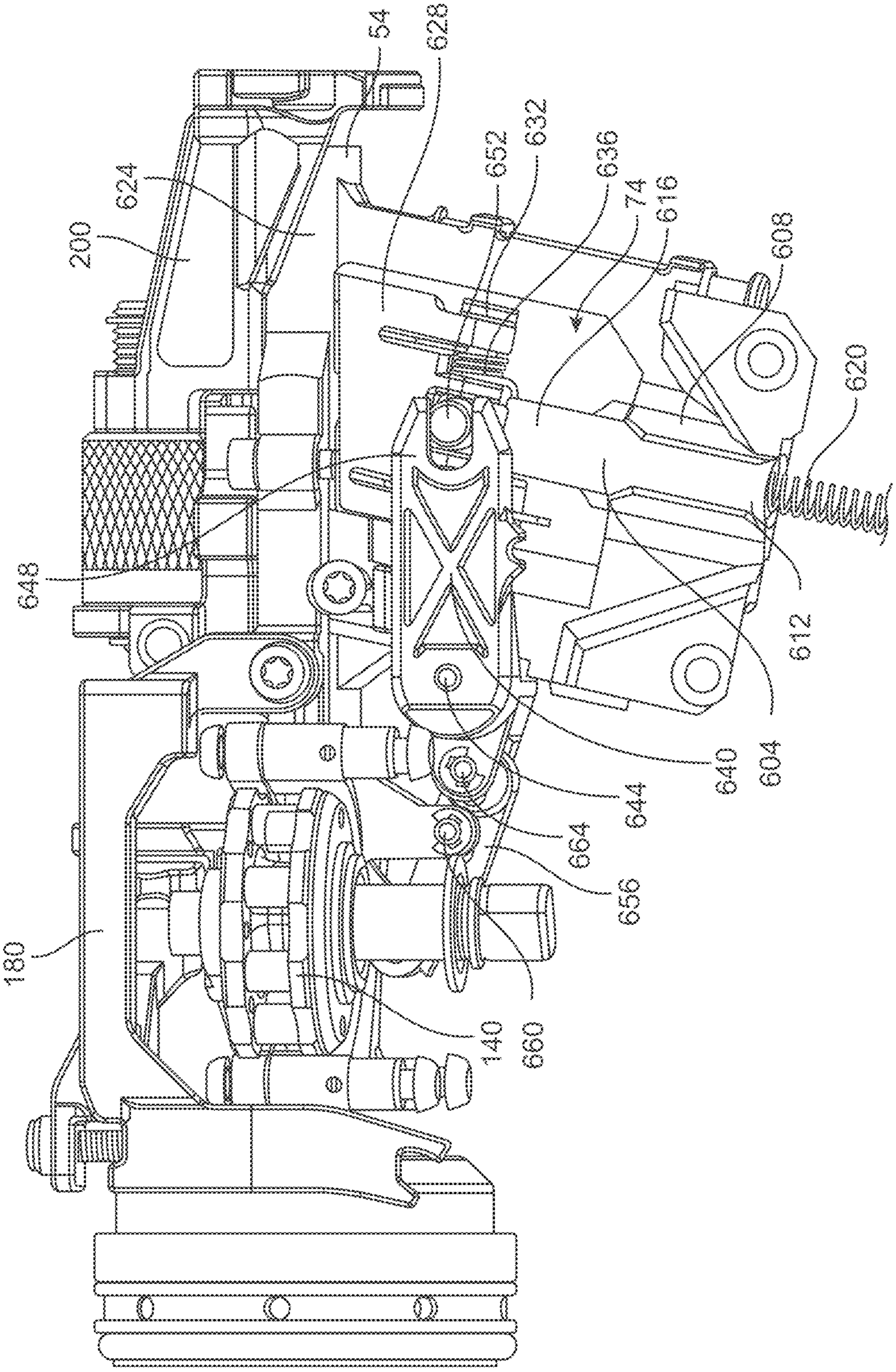
FIG. 17 is a right side view of the fastener delivery mechanism of FIG. 16.

FIGS. 11 and 14-15 show the details of the latch actuator assembly 160. As illustrated, the latch actuator assembly 160 includes base plate 450 that is formed with a semi-cylindrical notch 454 that is sized and shaped to fit around the lifting mechanism 140, e.g., around the lifter 380. A spring retainer 458 extends from an upper surface of the base plate 450 of the latch actuator assembly 160. The spring retainer 458 is configured to receive an end of a spring 460 (shown in FIG. 5) that is installed in compression between the spring retainer 458 of the latch actuator assembly 160 and the workpiece contact bracket 200 (FIG. 5) to bias the workpiece contact bracket 200 away from the spring retainer 458 along the nosepiece 54.

The latch actuator assembly 160 includes a generally rectangular shuttle housing 462 that is disposed on the upper surface of the base plate 450. It is to be understood that the shuttle housing 462 may be integrally formed with the base plate 450. As shown, the shuttle housing 462 includes a longitudinal axis 466 that is formed at an angle A2 with respect to a longitudinal axis 470 of the base plate 450. In a particular aspect, the angle A2 measures approximately 60 degrees to approximately 75 degrees. In the illustrated embodiment, the angle A2 is approximately 67 degrees. It is to be understood that the angle A2 may be within a range between, and including, any of the maximum and minimum values of A2 disclosed herein.

The shuttle housing 462 includes a slot 472 formed in an upper surface of the shuttle housing 462 at least partially along the length of the upper surface and along the longitudinal axis 466. The shuttle housing 462 also includes a pocket 476 that is sized and shaped to receive a shuttle 480 slidably, or otherwise movably, therein. As shown in FIG. 14, first shuttle spring 484 and a second shuttle spring 488 are disposed parallel to each other and parallel to the longitudinal axis 466 of the shuttle housing 462 in compression within the pocket 476 between a closed end 492 of the shuttle housing 462 (and the pocket 476) and the shuttle 480 to bias the shuttle 480 outward from the pocket 476 and an open end 496 of the shuttle housing 462 (and the pocket 476) so that a portion of the shuttle 480 extends into the semi-cylindrical notch 454.

As shown in FIG. 15, the latch actuator assembly 160 further includes a guide rib 500 that extends perpendicularly from a lower surface of the base plate 450. The guide rib 500 extends along the entire length of the base plate 450 and is parallel to the longitudinal axis 470. The guide rib 500 is sized and shaped to fit into the guide groove 358 (FIGS. 8-9) of the driver blade 112 and acts as a guide for the driver blade 112 as it moves between the TDC (i.e., retracted or ready) position and the BDC (i.e., extended or driven) position.

FIGS. 14-15 further show that the base plate 450 is formed with a curved slot 504 that extends through the base plate 450, i.e., from the upper surface to the lower surface. A portion of a latch assembly 508 fits into the curved slot 504 and rotates therein as the shuttle 480 moves linearly within the shuttle housing 462. As shown in FIG. 14, the latch assembly 508 includes a latch 512 that includes a first end 516 and a second end 520. A support post 524 extends perpendicularly from a lower surface of the latch 512 in a first direction. An actuator post 528 extends perpendicularly from an upper surface in a second direction opposite the first direction and opposite the support post 524.

When the latch actuator assembly 160 is assembled, the actuator post 528 extends through the curved slot 504 and into a bore 532 formed in the shuttle 480. The support post 524 is configured to fit into and rotate within a bore (not shown) formed in the nosepiece 54. Accordingly, as the shuttle 480 moves linearly back-and-forth within the shuttle housing 462, the latch assembly 508 rotates about the support post 524 and the second end 520 of the latch 512 moves back-and-forth. As described in greater detail below, the lifting mechanism 140 rotates to actuate the latch actuator assembly 160.

The operation of the lifting mechanism 140 and the latch actuator assembly 160 to fire and reset the driver blade 112 is as follows. In the ready position, the motor 144 is de-energized and stationary. The drive pin 396' is engaged with the lowermost drive tooth 350'. The cam 400 on the lifter 380 is adjacent and in contact with the end of shuttle 480 that is extending from the open end 496 of the shuttle housing 462. As shown, in the ready position, the magnet 412 within the magnet retainer 404 on the lifter 380 is in a position to be sensed by the first sensor 184 within the sensor bracket 180. Also, the second end 520 of the latch 512 is engaged with one of the locking protrusions 354 on the driver blade 112, e.g., the locking protrusion 354' nearest the first end 116 of the driver blade 112. Accordingly, the latch 512 holds the driver blade 112 locked in the TDC (i.e., retracted or ready) position against the force of the gas spring (i.e., the compressed gas within the storage chamber cylinder 100).

When a user actuates the trigger 50 of the fastener driver 10, the motor 144 is energized and rotates counterclockwise from the perspective of FIGS. 5 and 11 and also rotates the lifter 380 of the lifting mechanism 140 counterclockwise. As the lifter 380 rotates, the cam 400 on the lifter 380 pushes the shuttle 480 into the shuttle housing 462 against the force of the springs 484, 488. As the shuttle 480 moves into the shuttle housing 462 it pushes the actuator post 528 along the curved slot 504 formed in the base plate 450 of the latch actuator assembly 160 and the latch assembly 508 rotates on the support post 524 within the bore 536 of the nosepiece 54. The second end 520 of the latch 512 rotates away from the driver blade 112 into a position in which the latch 512 disengages the locking protrusion 354 and remains clear of the locking protrusions 354.

As disclosed herein, as the lifter 380 rotates, the cam 400 remains in contact with the shuttle 480 over the angle A1 which is within a range between and including 20° to 45°. The shape of the cam 400 keeps the shuttle 480 toggle into the shuttle housing 462 which, in turn, keeps the second end 520 of the latch 512 rotated into a position away from the driver blade 112 and clear of the locking protrusions 354. As the lifter 380 continues to rotate counterclockwise into a firing position, the latch 512 remains clear of the locking protrusions 354, while the peripheral notch 430 on the lower disk 392 of the lifter 380 remain clear of the drive teeth 350. In the firing position, the drive pins 396 on the lifter 380 are clear of the drive teeth 350 on the driver blade 112. Accordingly, the driver blade 112 is released and the force of the compressed gas behind the piston 108 and within the storage chamber cylinder 100 drives the piston 108 and the driver blade 112 toward the BDC (i.e., extended or driven position), into the nosepiece 54 to expel a fastener from the fastener driver 10 and drive the faster into a workpiece.

After the driver blade 112 is released and fired by the compressed gas in the storage chamber cylinder 100, the motor 144 continues to rotate the lifting mechanism 140 counterclockwise. When the cam 400 rotates past the latch actuator assembly 160, the shuttle 480 is released and the springs 484, 488 bias the shuttle 480 toward the lifter 380 and the second end 520 of the latch 512 moves toward the driver blade into a position in which the latch 512 is able to engage one of the locking protrusions 354 if the motor 144 fails. As the lifter 380 rotates the drive pins 396 engage the drive teeth 350 on the driver blade 112 in sequence to move the driver blade 112 in a direction away from the nosepiece 54 and return the driver blade 112 to the TDC (i.e., retracted or ready) position. Specifically, one of the drive pins 396" engages the uppermost drive tooth 350" and the other drive pins 396 engage each respective tooth 350 in sequence. As the lifter 380 returns the driver blade 112 to the TDC (i.e., retracted or ready) position, the piston 108 compresses the gas within the storage chamber cylinder 100. Moreover, as the driver blade 112 returns to the TDC (i.e., retracted or ready) position, the locking protrusions 354 will rotate the latch 512 away from the driver blade 112 against the springs 484, 488 which return the latch 512 toward the driver blade 112 as each locking protrusion 354 passes. The motor 144 continues to rotate the lifting mechanism 140 counterclockwise until the driver blade 112 is returned to the TDC (i.e., retracted or ready) position and the magnet 412 on the lifter 380 is detected by the first sensor 184 in the sensor bracket 180 to signal the controller to de-energize the motor 144. The drive pin 396' once again engages the lowermost drive tooth 350' and the second end 520 of the latch 512 engages the locking protrusion 354' nearest the first end 116 of the driver blade 112 to hold the driver blade 112 in the ready position until the trigger 50 is, once again, pressed by a user. It is to be understood that the illustrated fastener driver 10 operates on a gas spring principle utilizing the lifting mechanism 140 and the piston 108 to further compress the gas within the driver cylinder 104 and the storage chamber cylinder 100.

FIGS. 16-19 illustrate the details of the fastener delivery mechanism 74. As shown, the fastener delivery mechanism 74 includes a support post 604 that is slidably disposed within a bracket 608 on the nosepiece 54. The support post 604 includes a proximal end 612 and a distal end 616. A spring 620 is installed in compression adjacent the proximal end 612 of the support post 604 to bias the support post 604 toward a barrel 624 of the nosepiece 54. An advancer 628 is mounted on the distal end 616 of the support post 604 via a hinge pin 632. A torsional spring 636 is disposed on the hinge pin 632 to bias the advancer 628 around the hinge pin 632 toward the nosepiece 54.

The fastener delivery mechanism 74 further includes a first rocker arm 640 rotatably mounted on the nosepiece 54 via a first post 644 (e.g., a threaded fastener). The first rocker arm 640 includes a forked end 648 that fits around a lateral post 652 on the distal end of the support post 604. As shown, the fastener delivery mechanism 74 also includes a second rocker arm 656 rotatably mounted on the nosepiece 54 via a second post 660 and mounted to the first rocker arm 640 via a third post 664. A spring loaded actuator 668 is installed on a free end of the second rocker arm 656. The spring loaded actuator 668 may only rotate in a single direction toward the delivery end of the fastener driver 10 against the force of a spring which returns it to an upright position.

Figure 18:
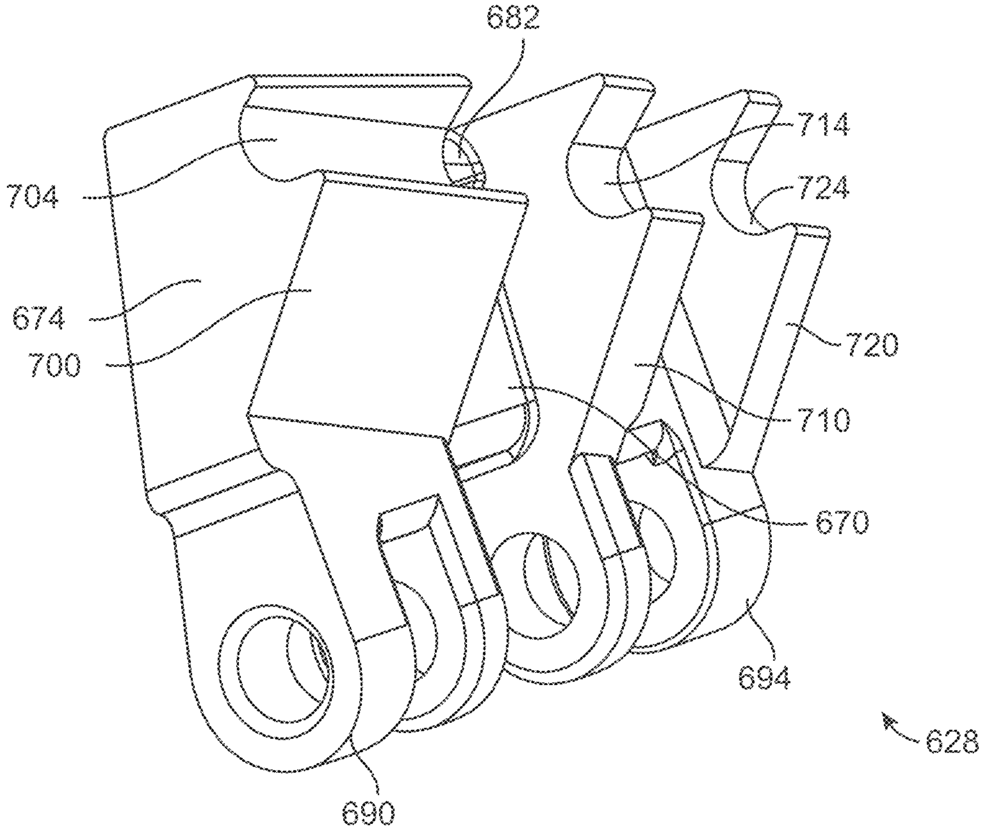
FIG. 18 is a perspective view of an advancer for the fastener delivery mechanism of FIG. 16.
Figure 19:
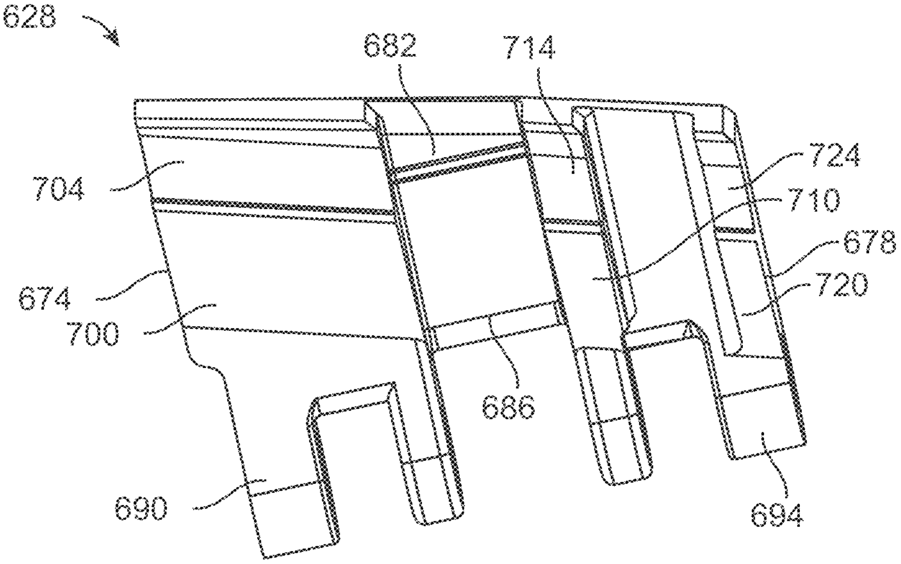
FIG. 19 is a side plan view of the advancer of FIG. 16.

Referring to FIGS. 18 and 19, the advancer 628 is illustrated in greater detail. The advancer 628 includes a body 670 that includes a first end 674, a second end 678, a top 682, and a bottom 686. A first pair of hinge barrels 690 extend in a generally downward direction from the bottom 686 of the body 670 near the first end 674. A second pair of hinge barrels 694 extend in a generally downward direction from the bottom 686 of the body 670 near the second end 678. The pairs of hinge barrels 690, 694 are spaced apart from each other to form an opening that fits over the distal end 616 of the support post 604. The hinge pin 632 fits through both pairs of hinge barrels 690, 694 and a bore formed in the distal end 616 of the support post 604.

As shown, the advancer 628 includes a first ramped structure 700 that extends from the bottom 686 of the body 670 toward the top 682. The first ramped structure 700 is narrowest at the bottom 686 and widest at the top 682. The first ramped structure 700 terminates at a first groove 704 near the top 682 that is sized and shaped to receive a portion of a fastener therein. The advancer 628 includes a second ramped structure 710 that extends from the bottom 686 of the body 670 toward the top 682. The second ramped structure 710 is narrowest at the bottom 686 and widest at the top 682. The second ramped structure 710 terminates at a second groove 714 near the top 682 that is sized and shaped to receive a portion of a fastener therein. The advancer 628 further includes a third ramped structure 720 that extends from the bottom 686 of the body 670 toward the top 682. The third ramped structure 720 is narrowest at the bottom 686 and widest at the top 682. The third ramped structure 720 terminates at a third groove 724 near the top 682 that is sized and shaped to receive a portion of a fastener therein.

When the driver blade 112 is fired, or moved to the BDC (i.e., extended or driven) position, the actuator tooth 362 on the driver blade 112 moves past the spring loaded actuator 668, which rotates downward briefly before the spring force returns it to the upright position. As the driver blade 112 is returned to the TDC (i.e., retracted or ready) position by the lifting mechanism 140, as described herein, the actuator tooth 362 on the driver blade 112 engages the spring loaded actuator 668 to rotate the second rocker arm 656 counter-clockwise in FIG. 17. This causes the first rocker arm 640 to rotate clockwise in FIG. 17 and move the support post 604 away from the barrel 624 the nosepiece 54. As the support post 604 moves away from the barrel 624, the ramped structures 700, 710, 720 on the advancer 628 move against a fastener to be loaded and rotate the advancer 628 outward from the fastener against the spring force provided by the torsional spring 636 until the grooves 704, 714, 724 are aligned with the fastener to be loaded. When the grooves 704, 714, 724 are aligned with the fastener, the torsional spring 636 biases the advancer 628 toward the nosepiece 54 so that the grooves 704, 714, 724 fit around the fastener. Then, the spring 620 biases the support post 604 in an upward direction toward the barrel 624 of the nosepiece 54 and loads the fastener that is held within the grooves 704, 714, 724 of the advancer 628 into the barrel 624 in a ready position to be expelled from the fastener driver 2000 and driven into a workpiece when the trigger 50 is actuated.

As noted above, the reduced stroke length L1 of the driver blade 112 enables a reduced size of the lifter 380. That is, the driver pins 396 are able to be oriented on imaginary circles having reduced diameters D5, D6. The reduced size of the lifter 380 allows operation of the motor 144 to be more efficient. That is, the reduced size of the lifter 380 reduces the required lifter torque and geartrain loading, while maintaining effectiveness of the fastener driver 10. Additionally, the reduced size of the lifter 380 and the reduced size of piston 108 decreases the size and weight of the fastener driver 10 while have the same or better power performance. In the illustrated embodiment, the lifter torque measures approximately 165 in-lbs. Additionally, the drive cycle of the fastener 10 is also shorter. Because the motor 144 is more efficient, the user is able to fire 4.3 nails per second, which is more nails per second than can be driven by conventional drivers. Accordingly, the driver blade 112 is configured to reciprocate between the TDC position and the BDC position at a frequency of at least approximately 2 Hertz (Hz). In other embodiments, the driver blade 112 is configured to reciprocate between the TDC position and the BDC position at a frequency of approximately 3.25 Hz. In other embodiments, the driver blade 112 is configured to reciprocate between the TDC position and the BDC position at a frequency of approximately 2 Hz to approximately 5 Hz. Moreover, the stroke length L1 of the piston 108 between the TDC position and the BDC position is approximately 70 mm or less while reciprocating at a frequency of at least 3.25 Hz. Moreover, the stroke length L1 of the piston 108 between the TDC position and the BDC position is approximately 65 mm or greater while reciprocating at a frequency of at least 3.25 Hz. Moreover, the stroke length L1 of the piston 108 between the TDC position and the BDC position is approximately 65 mm or greater while reciprocating at a frequency of at least 2 Hz. Also, because the motor 144 is more efficient, the driver 10 can drive more fasteners without thermal shutdown of the motor 144. That is, a temperature of the motor 144 may be measured (e.g., by a sensor) and monitored by the circuit board 148. When the temperature rises above a predetermined threshold temperature, the circuit board 148 will no longer allow the motor 144 to be driven, which results in thermal shutdown of the motor.

In the illustrated embodiments, the driver can drive at least 1560 nails without thermal shut down. In some embodiments, the driver can drive at least 480 nails without thermal shutdown. In some embodiments, the driver can drive at least 500 nails without thermal shutdown. In some embodiments, the driver can drive at least 700 nails thermal shutdown. In some embodiments, the driver can drive at least 800 nails thermal shutdown. In some embodiments, the driver can drive at least 900 nails thermal shutdown. In some embodiments, the driver can drive at least 1000 nails without thermal shutdown. In some embodiments, the driver can drive at least 1100 nails without thermal shutdown. In some embodiments, the driver can drive at least 1200 nails without thermal shutdown. In some embodiments, the driver can drive at least 1300 nails without thermal shutdown. In some embodiments, the driver can drive at least 1400 nails without thermal shutdown. In some embodiments, the driver can drive at least 1500 nails without thermal shutdown.

The drive unit is configured to remain continuously activated for over 100 seconds while reciprocating the driver blade at a frequency of at least 3.25 Hz. The drive unit is configured to remain continuously activated for over 100 seconds while reciprocating the driver blade at a frequency of at least 2 Hz. The drive unit may be configured to remain continuously activated for over 360 seconds while reciprocating the driver blade at a frequency of at least 3.25 Hz. The drive unit is configured to remain continuously activated for over 360 seconds while reciprocating the driver blade at a frequency of at least 2 Hz. The drive unit may be configured to remain continuously activated for 100 seconds to 360 seconds while reciprocating the driver blade at a frequency of at least 3.25 Hz. The drive unit may be configured to remain continuously activated for 100 seconds to 360 seconds while reciprocating the driver blade at a frequency of at least 2 Hz. The drive unit may be configured to remain continuously activated for 150 seconds to 360 seconds while reciprocating the driver blade at a frequency of at least 3.25 Hz. The drive unit may be configured to remain continuously activated for 150 seconds to 360 seconds while reciprocating the driver blade at a frequency of at least 2 Hz. The drive unit may be configured to remain continuously activated for 200 seconds to 360 seconds while reciprocating the driver blade at a frequency of at least 3.25 Hz. The drive unit may be configured to remain continuously activated for 200 seconds to 360 seconds while reciprocating the driver blade at a frequency of at least 2 Hz. The drive unit may be configured to remain continuously activated for 250 seconds to 360 seconds while reciprocating the driver blade at a frequency of at least 3.25 Hz. The drive unit may be configured to remain continuously activated for 250 seconds to 360 seconds while reciprocating the driver blade at a frequency of at least 2 Hz. The drive unit may be configured to remain continuously activated for 300 seconds to 360 seconds while reciprocating the driver blade at a frequency of at least 3.25 Hz. The drive unit may be configured to remain continuously activated for 300 seconds to 360 seconds while reciprocating the driver blade at a frequency of at least 2 Hz. The drive unit may be configured to remain continuously activated for 100 seconds to 200 seconds while reciprocating the driver blade at a frequency of at least 3.25 Hz. The drive unit may be configured to remain continuously activated for 100 seconds to 200 seconds while reciprocating the driver blade at a frequency of at least 2 Hz. The drive unit may be configured to remain continuously activated for 150 seconds to 300 seconds while reciprocating the driver blade at a frequency of at least 3.25 Hz. The drive unit may be configured to remain continuously activated for 150 seconds to 300 seconds while reciprocating the driver blade at a frequency of at least 2 Hz.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:

a housing;

a nosepiece extending from the housing;

an inner cylinder within the housing;

a piston movable within the inner cylinder from a top-dead-center (TDC) position to a driven or bottom-dead-center (BDC) position, the piston having a stroke length of the piston between the TDC position and the BDC position measuring greater than 60 mm and less than 90 mm;

a driver blade attached to the piston for movement therewith along a driving axis from the TDC position toward the BDC position for driving a fastener into a workpiece, the driver blade including, a first end, a second end, and a plurality of drive teeth extending from one side between the first end and the second end;

a lifter operable to move the piston and driver blade from the BDC position toward the TDC position, wherein the lifter includes a body and a plurality of drive pins supported upon the body, wherein each of the plurality of drive pins is configured to engage one of the plurality of drive teeth;

a drive unit operably coupled to the lifter to provide torque thereto, causing the lifter to rotate;

a canister magazine coupled to the nosepiece in which collated fasteners are receivable; and a fastener delivery mechanism disposed adjacent the nosepiece for individually transferring collated fasteners in the canister magazine to a driver channel in the nosepiece.

2. The powered fastener driver of claim 1, further comprising a source of pressurized gas in fluid communication with the inner cylinder, wherein a striker force of the pressurized gas acting on the piston at the TDC position is 200 lbf to 300 lbf.

3. The powered fastener driver of claim 2, further comprising an outer storage chamber cylinder positioned within the housing and including the pressurized gas in fluid communication with the inner cylinder, wherein the outer storage chamber cylinder includes a first end and a second end opposite the first end, and wherein the first end defines a first longitudinal axis that is co-linear with the driving axis and the second end defines a second longitudinal axis that extends through a center thereof and is offset from the first longitudinal axis, such that the second end of the outer storage chamber cylinder is non-concentric with the first end of the outer storage chamber cylinder.

4. The powered fastener driver of claim 3, wherein the inner cylinder includes a first end and a second end opposite a first end, and wherein the first end of the inner cylinder is coupled to the first end of the outer storage chamber cylinder.

5. The powered fastener driver of claim 4, wherein the outer storage chamber cylinder defines a volume, wherein a first portion of the volume is defined on a first side of the driving axis and a second portion of the volume is defined on a second side of the driving axis, and wherein the second portion is greater than the first portion.

6. The powered fastener driver of claim 5, wherein the housing defines a head portion, a drive unit housing portion, and a handle portion that is spaced apart from the drive unit housing portion, and wherein the second portion of the volume is at least partially positioned between the drive unit housing portion and the handle portion.

7. The powered fastener driver of claim 1, wherein, in response to continuous activation of the drive unit to rotate the lifter, the driver blade is configured to reciprocate between the TDC position and the BDC position at a frequency of 2 Hertz (Hz) to 5 Hertz (Hz).

8. The powered fastener driver of claim 7, wherein the stroke length of the piston between the TDC position and the BDC position is between 65 mm and 70 mm while reciprocating at a frequency between 2 Hertz (Hz) and 3.25 Hertz (Hz).

9. The powered fastener driver of claim 8, wherein the drive unit is configured to remain continuously activated for between 100 seconds to 360 seconds while reciprocating the driver blade at a frequency of between 2 Hertz (Hz) and 3.25 Hertz (Hz).

10. The powered fastener driver of claim 1, wherein the piston includes a circumferential groove, wherein a seal ring is positioned within the circumferential groove, and wherein the seal ring has a thickness of 2 mm to 5.5 mm.

11. The powered fastener driver of claim 1, wherein the piston has a diameter of less than 45 mm, and wherein the plurality of drive pins are positioned on the body along an imaginary circle coaxial with a rotational axis of the lifter and having a diameter of less than 40 mm.

12. A powered fastener driver comprising:

a housing;

a nosepiece extending from the housing;

a workpiece contact bracket at least partially surrounding the nosepiece, wherein the workpiece contact bracket is movable relative to the nosepiece;

an inner cylinder within the housing;

a piston movable within the inner cylinder from a top-dead-center (TDC) position to a driven or bottom-dead-center (BDC) position, the piston having a stroke length of the piston between the TDC position and the BDC position measuring greater than 60 mm and less than 90 mm;

a driver blade attached to the piston for movement therewith along a driving axis from the TDC position toward the BDC position for driving a fastener into a workpiece, the driver blade including, a first end, a second end, a plurality of drive teeth extending from one side between the first end and the second end, and an actuator tooth;

a lifter operable to move the piston and driver blade from the BDC position toward the TDC position, wherein the lifter includes a body and a plurality of drive pins supported upon the body, wherein each of the plurality of drive pins is configured to engage one of the plurality of drive teeth;

a drive unit operably coupled to the lifter to provide torque thereto, causing the lifter to rotate; and a fastener delivery mechanism disposed adjacent the nosepiece, wherein the fastener delivery mechanism is actuated by the actuator tooth on the driver blade as the driver blade is returned to a ready position to load a fastener into the nosepiece.

13. The powered fastener driver of claim 12, wherein the piston includes a first circumferential groove, a second circumferential groove, and a third circumferential groove, and wherein a seal ring is positioned within the first circumferential groove and configured to engage an inner surface of the inner cylinder, a first guide ring is positioned in the second circumferential groove, and a second guide ring is positioned in the third circumferential groove, each of the first guide ring and the second guide ring are configured to engage the inner surface of the inner cylinder.

14. The powered fastener driver of claim 12, further comprising a source of pressurized gas in fluid communication with the inner cylinder, wherein a striker force of the pressurized gas acting on the piston at the TDC position is 200 lbf to 300 lbf.

15. The powered fastener driver of claim 12, wherein the piston has a diameter of less than 45 mm, and wherein the plurality of drive pins are positioned on the body along an imaginary circle coaxial with a rotational axis of the lifter and having a diameter of less than 40 mm.

16. The powered fastener driver of claim 12, wherein the fastener delivery mechanism includes an advancer mounted on a support post and when the actuator tooth actuates the fastener delivery mechanism the advancer moves into contact with the fastener and a spring biases the support post and the advancer toward the nosepiece to load the fastener into a barrel of the nosepiece.

17. The powered fastener driver of claim 16, wherein the fastener delivery mechanism includes a torsional spring that biases the advancer on the support post toward the fastener as the as the advancer moves along the fastener.

18. The powered fastener driver of claim 16, wherein the advancer includes a least one ramped surface that terminates in at least one groove and as the advancer moves against the fastener, the at least one ramped surface pushes the advancer away from the fastener until the at least one groove is aligned with the fastener and the advancer is biased toward the fastener until the at least one groove fits around the fastener, and wherein the fastener delivery mechanism includes at least one rocker arm operably coupled with the advancer, wherein the at least one rocker arm is rotated by the actuator tooth on the driver blade as the driver blade is returned to the ready position and as the at least one rocker arm rotates, the advancer moves along the fastener until the at least one grooves fits around the fastener.

19. A powered fastener driver comprising:

a housing;

an inner cylinder within the housing;

a piston movable within the inner cylinder from a top-dead-center (TDC) position to a driven or bottom-dead-center (BDC) position, the piston having a stroke length of the piston between the TDC position and the BDC position measuring greater than 60 mm and less than 90 mm;

a driver blade attached to the piston for movement therewith along a driving axis from the TDC position toward the BDC position for driving a fastener into a workpiece, the driver blade including, a first end, a second end, and a plurality of drive teeth extending from one side between the first end and the second end, the first end being cylindrical and defining a striker face that is configured to strike and drive a fastener;

a lifter operable to move the piston and driver blade from the BDC position toward the TDC position, wherein the lifter includes a body and a plurality of drive pins supported upon the body, wherein each of the plurality of drive pins is configured to engage one of the plurality of drive teeth; and a drive unit operably coupled to the lifter to provide torque thereto, causing the lifter to rotate.

20. The powered fastener driver of claim 19, wherein the piston has a diameter of less than 45 mm, and wherein the plurality of drive pins are positioned on the body along an imaginary circle coaxial with a rotational axis of the lifter and having a diameter of less than 40 mm.

* * * * *